Sept. 1, 1936.   D. H. SCHWEYER   2,052,944
AUTOMATIC BRAKE APPARATUS
Filed March 11, 1924   7 Sheets-Sheet 2
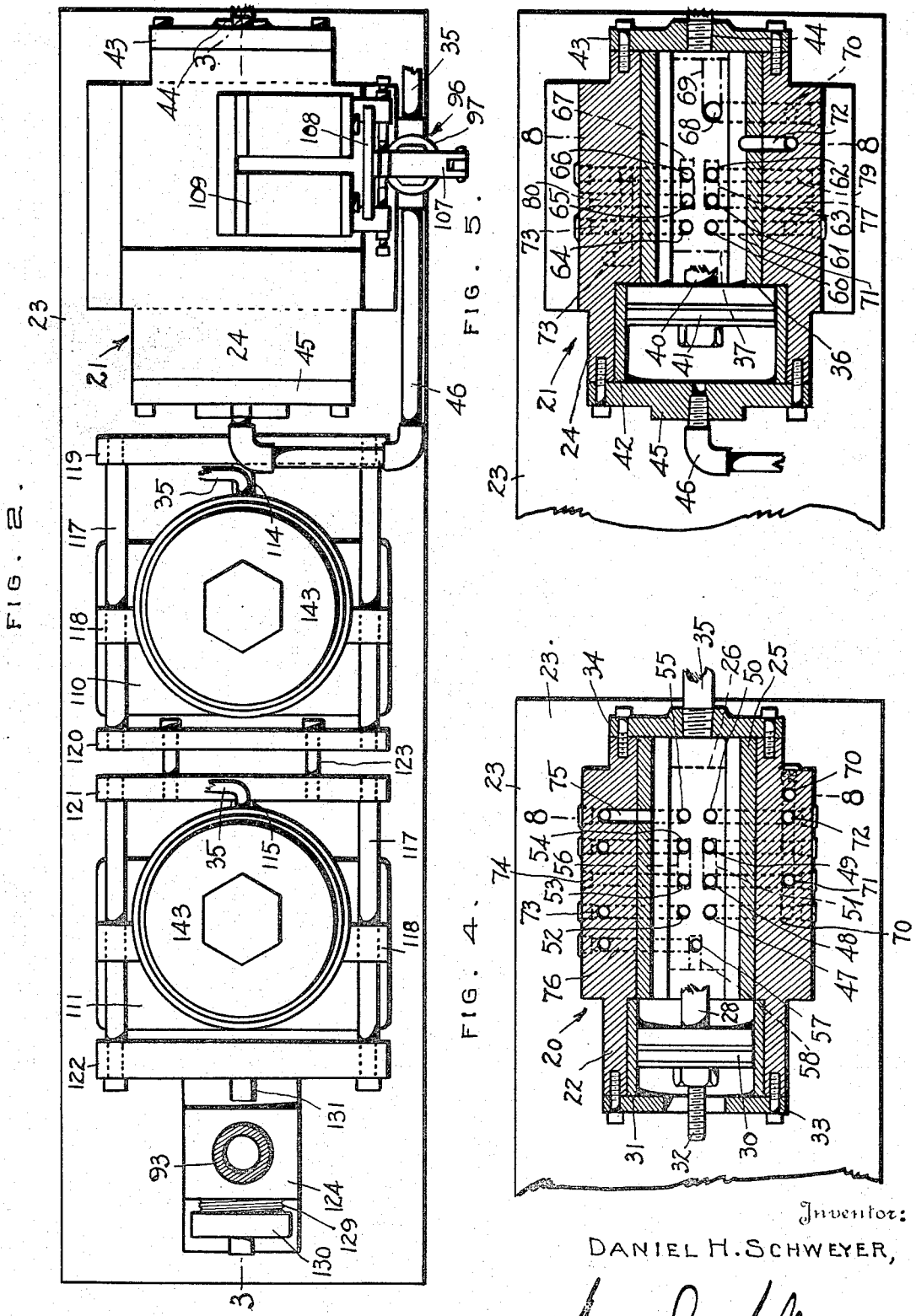
Inventor:
DANIEL H. SCHWEYER,
By Monroe E. Miller
Attorney.

Sept. 1, 1936.  D. H. SCHWEYER  2,052,944
AUTOMATIC BRAKE APPARATUS
Filed March 11, 1924   7 Sheets-Sheet 3
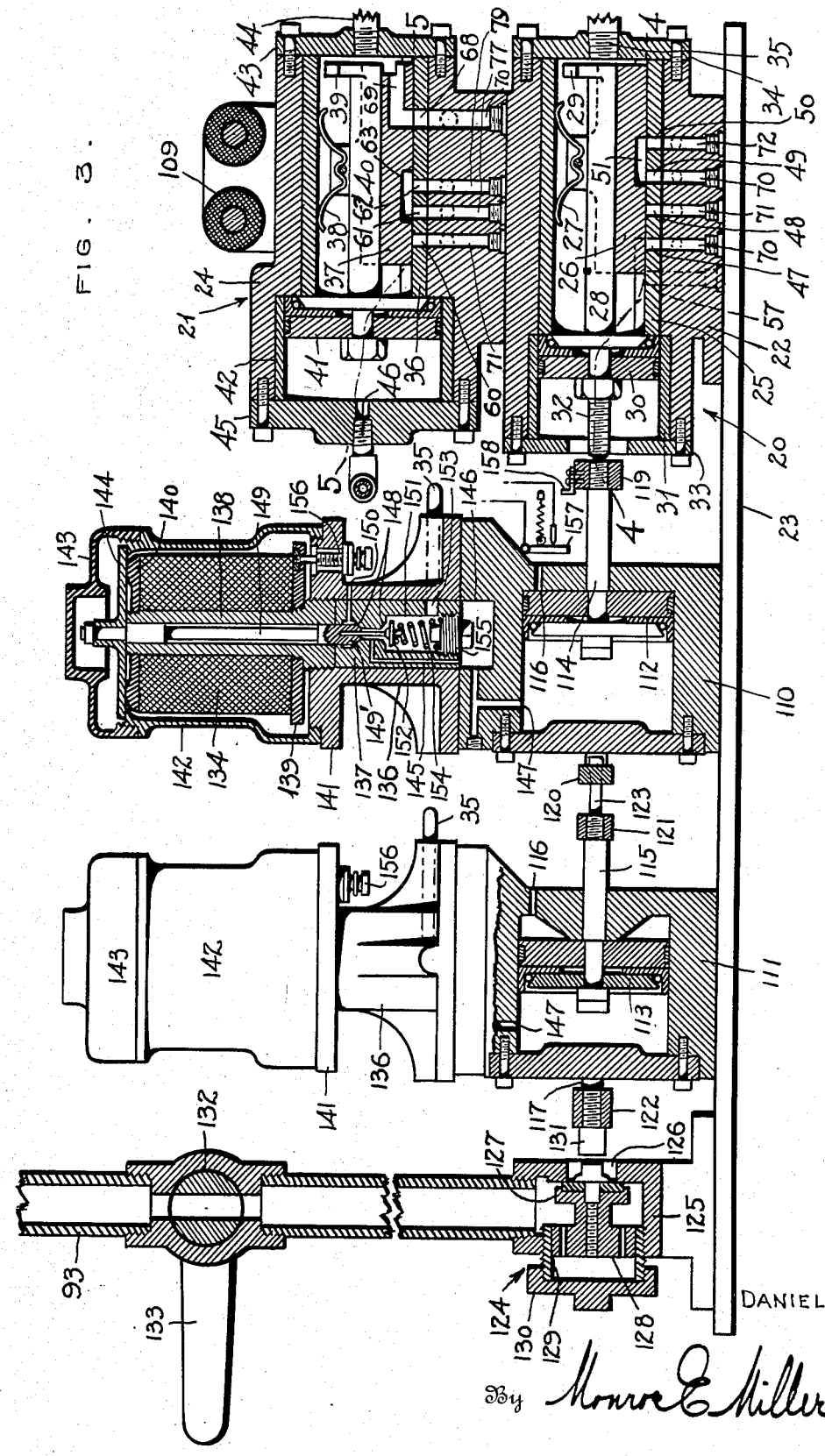
Inventor:
DANIEL H. SCHWEYER
By Monroe E. Miller
Attorney.

Sept. 1, 1936.  D. H. SCHWEYER  2,052,944
AUTOMATIC BRAKE APPARATUS
Filed March 11, 1924  7 Sheets-Sheet 4

Inventor:
DANIEL H. SCHWEYER,
By Monroe E. Miller
Attorney

Sept. 1, 1936.                  D. H. SCHWEYER                    2,052,944
                            AUTOMATIC BRAKE APPARATUS
                    Filed March 11, 1924        7 Sheets-Sheet 5
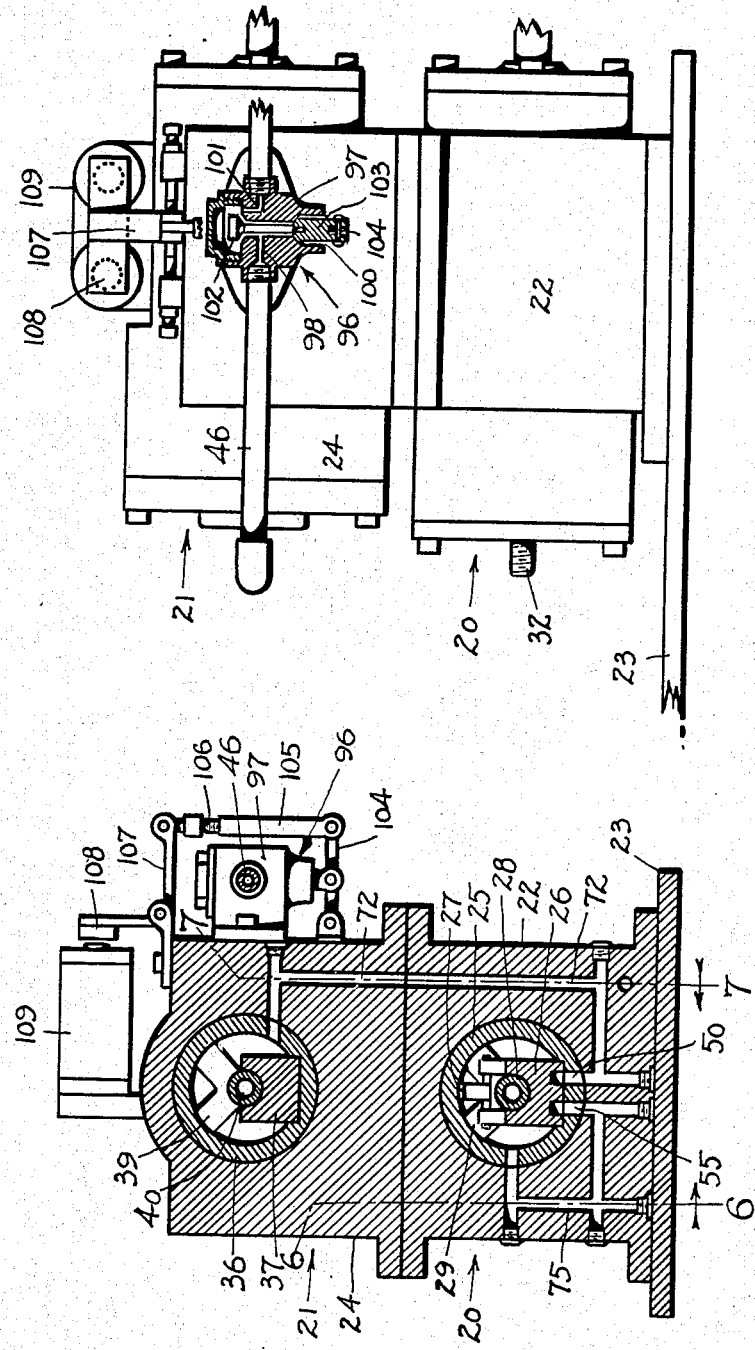
Inventor:
DANIEL H SCHWEYER,
By Monroe E Miller
Attorney

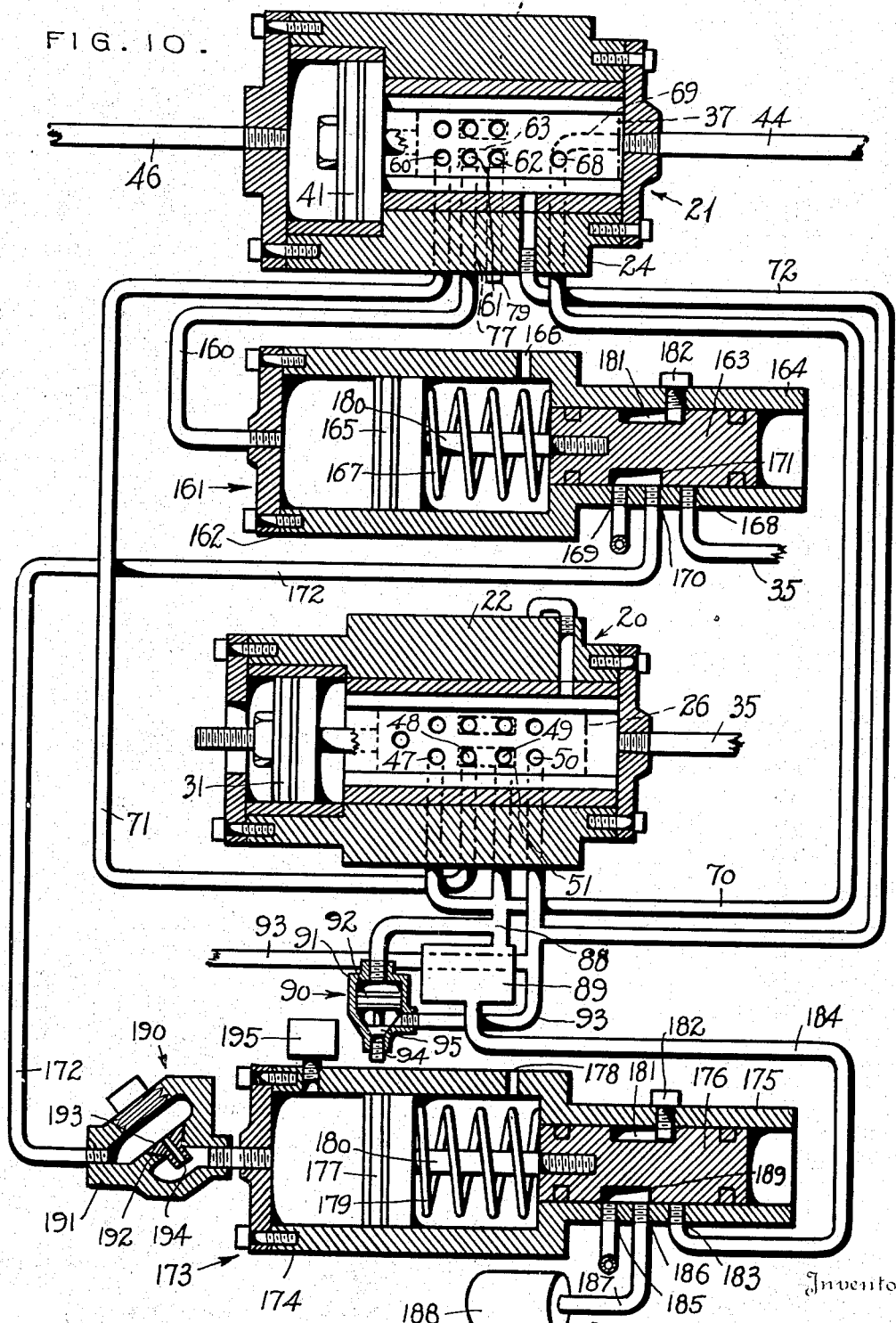

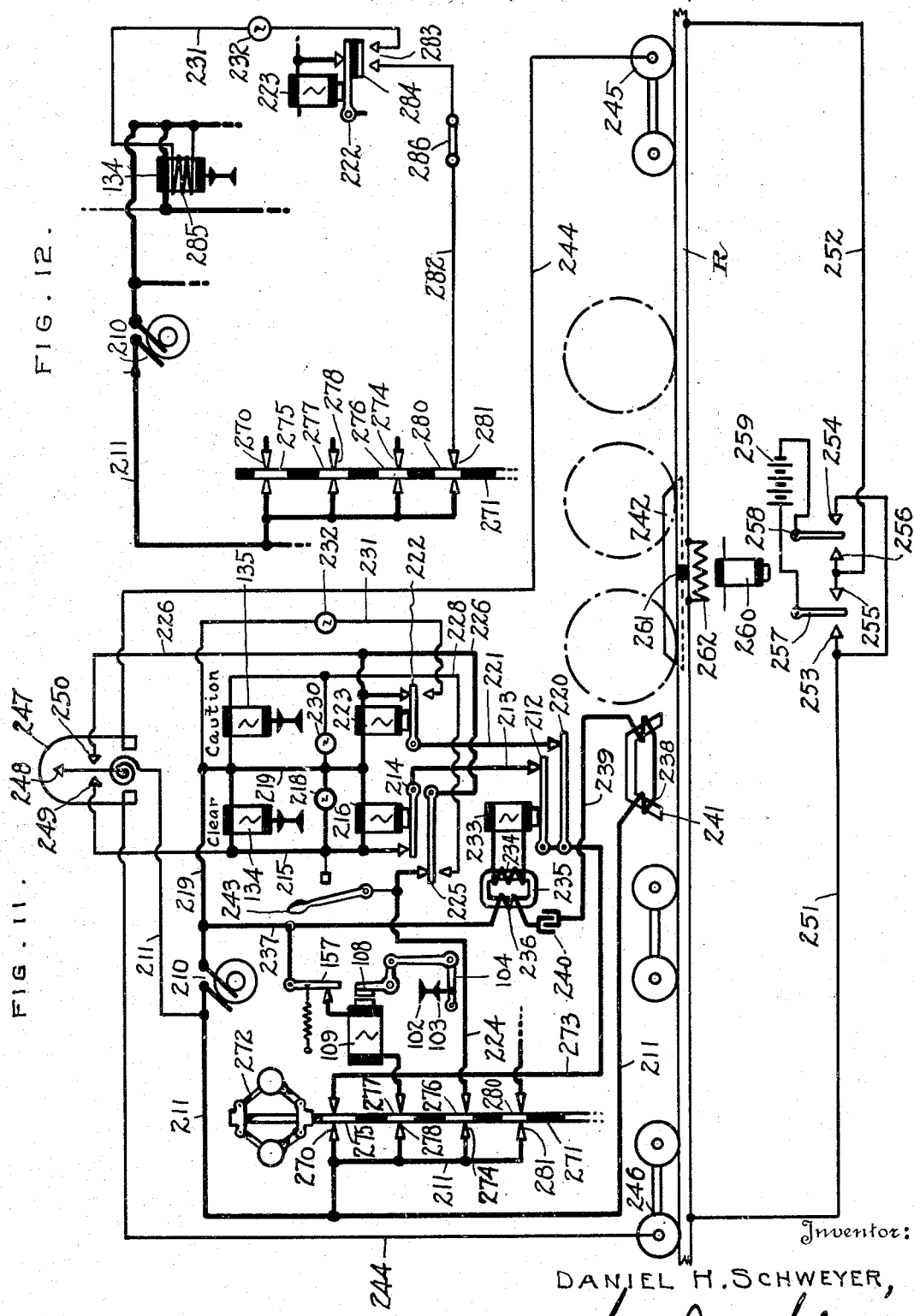

Patented Sept. 1, 1936

2,052,944

UNITED STATES PATENT OFFICE 2,052,944

AUTOMATIC BRAKE APPARATUS

Daniel Herbert Schweyer, Easton, Pa.

Application March 11, 1924, Serial No. 698,533

46 Claims. (Cl. 303—18)

The present invention appertains to automatic train control apparatus, and is more particularly an improvement over the automatic train control apparatus disclosed in my Patents Nos. 1,279,454 and 1,389,602, granted September 17, 1918, and September 6, 1921, respectively.

One object of the invention is to improve the apparatus generally in the construction, arrangement and combination of the component devices thereof, in order to enhance the utility and efficiency.

Another object is the provision of such apparatus having novel and effective means for obtaining service and emergency applications of the brakes under different conditions.

A further object is the provision of a novel pneumatic equipment, for controlling the air brakes, and under the control of electrical equipment for obtaining different conditions of control, such as clear, caution and danger.

A still further object is to improve the pneumatic devices and the means for controlling and interconnecting them, in order that the apparatus will function efficiently in response to controlling signals or impulses.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings wherein—

Fig. 2 is a plan view of the major portion of the pneumatic equipment, showing the parts in the position which they assume under clear conditions.

Fig. 3 is a vertical section on the line 3—3 of Fig. 2, portions being shown in elevation.

Fig. 4 is a horizontal section on the line 4—4 of Fig. 3, showing the piston and slide valve in intermediate or caution position.

Fig. 5 is a horizontal section on the line 5—5 of Fig. 3.

Fig. 8 is a cross section taken on the lines 8—8 of Figs. 4 and 5.

Fig. 9 is a side elevation of the superposed cylinder and valve casing blocks showing the emergency valve in section.

Fig. 10 is a diagrammatical view of a portion of the pneumatic equipment, illustrating, partly in section and partly in elevation, means for obtaining an intermittent or service application of the brakes.

Fig. 11 is a diagrammatical view illustrating the electrical equipment which controls the pneumatic equipment.

Fig. 12 is a diagrammatical view of a modification of such electrical equipment.

Figure 1:
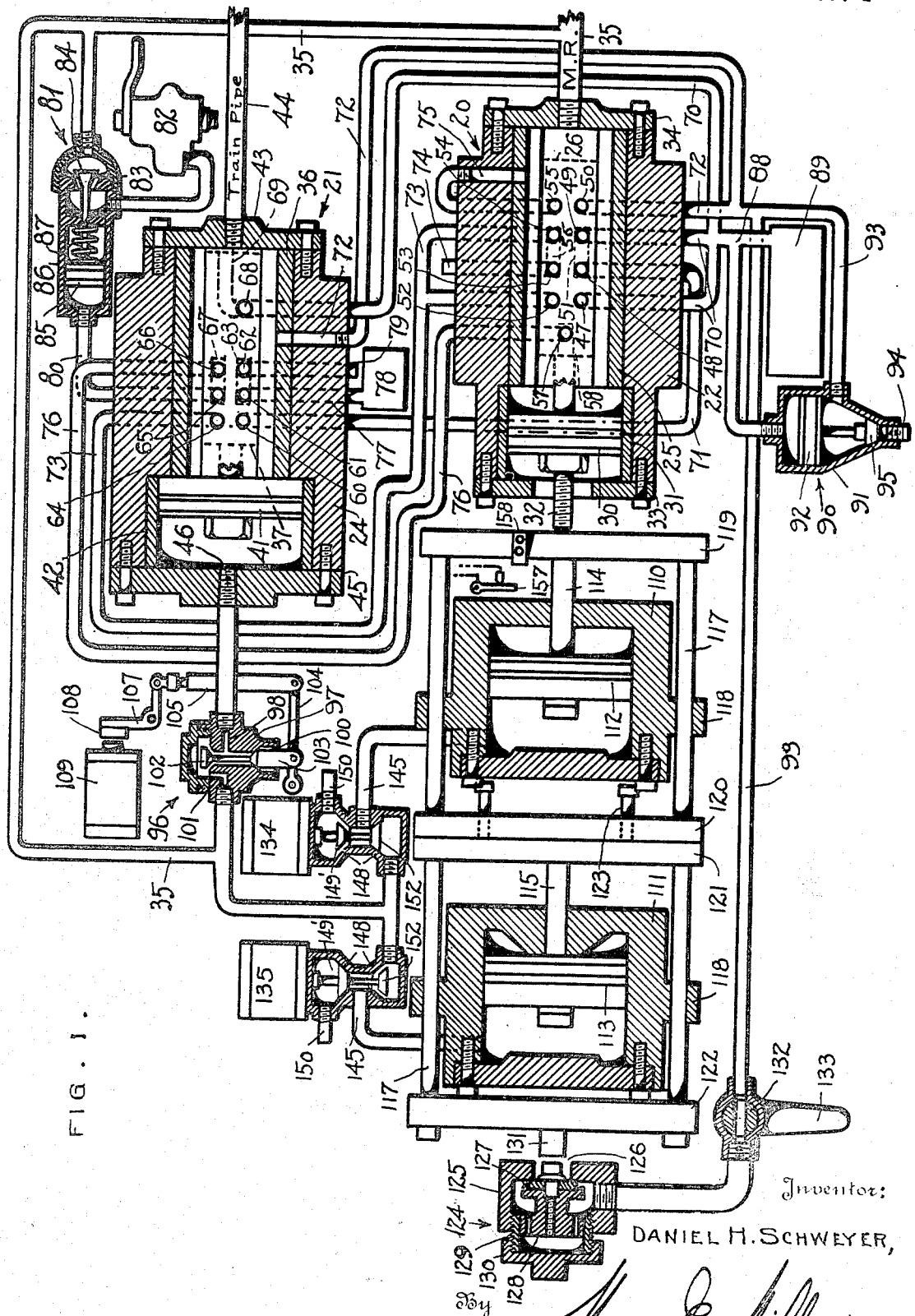
Figure 1 is a diagrammatical view of the pneumatic equipment, portions being shown in section and portions shown in elevation, with the parts in the position they assume under caution conditions.
Figure 7:
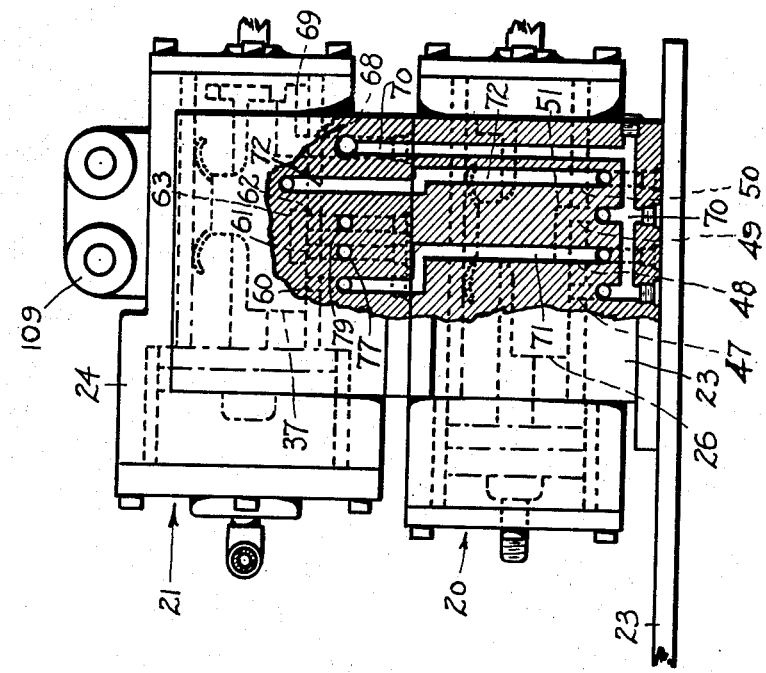
Fig. 7 is an opposite side elevation of the parts shown in Fig. 6, partly in section on the line 7—7 of Fig. 8.
Figure 6:
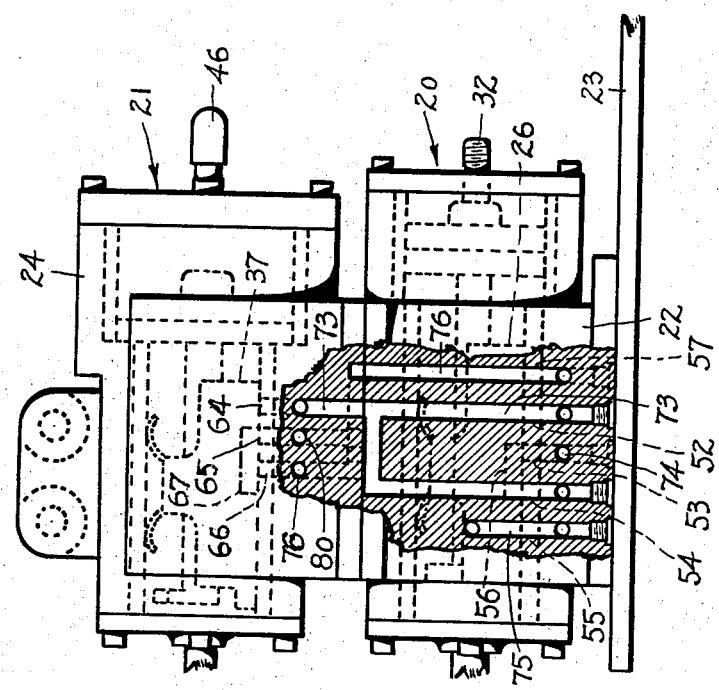
Fig. 6 is a side elevation of the superposed cylinder and valve casing blocks, shown partly in section on the line 6—6 of Fig. 8.

The present apparatus is an improvement over the apparatus disclosed in U. S. Patent No. 1,279,454, granted September 17, 1918, on an application filed September 23, 1913, and U. S. Patent No. 1,389,602, granted Sept. 6, 1921.

Pneumatic equipment

The flow of air to and from the usual train pipe, for releasing and applying the brakes, is controlled by valve devices 20 and 21, which include the superposed cylinder and valve casing blocks 22 and 24, respectively. The block 22 is secured on a base or bed plate 23, and the block 24 is secured on the block 22.

The valve device 20 has a tubular valve guide 25 fitted therein, said block 24 being bored from one end to the other, and the bottom of said guide 25 provides a seat for the slide valve 26, the bottom of the guide being preferably formed with a channel receiving the valve for longitudinal movement. A spring 27 bears on the valve 26 and contacts slidably with the top of the guide 25 to hold the valve 26 down on its seat under spring pressure.

The valve device 20 includes an actuator for the valve 26, and said actuator comprises a piston rod 28 seated and secured in the groove in the upper surface of the valve 26, and the rod 28 has upwardly extending lugs 29 at its forward end contacting with the upper portion of the guide 25 to hold the rod 28 and valve 26 down. The rod 28 is secured to a piston 30 which slides in a cylinder 31 fitted within the block 22 beyond the rear end of the valve guide 25, and a push rod or finger 32 is carried by the piston and projects out through an opening provided in the cylinder head 33 which is secured to the rear end of the block 22 across the rear end of the cylinder 31. A cylinder head 34 is secured to the forward end of the block 22 across the forward end of the guide 25, and the main reservoir pipe 35 is attached to the cylinder head 34 to admit main reservoir air into the valve guide 25 in front of the piston 30 so as to have a tendency to push the piston 30 and valve 26 rearwardly.

The valve device 21 is somewhat similar to the device 20, and includes a tubular valve guide 36 in the block 24 having a channeled valve seat at the bottom thereof on which the slide valve 37 bears, a spring 38 holding the valve down on the seat, and the piston rod 40 which is secured on the valve 37 having the lugs 39. The lugs 39 and spring 38 contact with the upper portion of the guide 36 to hold the valve and piston rod down, and said piston rod is secured to a piston 41 working in a cylinder 42 fitted within the block 24 beyond the rear end of the guide 36. A cylinder head 43 is secured to the forward end of the block 24 across the forward end of the guide 36, and the train pipe 44 is secured to the cylinder head 43 to admit train pipe air into the guide 36 in front of the piston 41 so as to have a tendency to move said piston rearwardly. A cylinder head 45 is secured to the rear end of the block 24 across the rear end of the cylinder 42, and a pipe 46 is attached to the cylinder head 45 for the flow of air through said pipe into and out of the cylinder 42 behind the piston 41, said piston constituting the actuator for the valve 37.

The valves 26 and 37, in their different positions, control the flow of air through several passages. For this purpose, the valve seat of the valve guide 25 has the ports 47, 48, 49 and 50 arranged in a longitudinal row, and said seat has another longitudinal row of ports 52, 53, 54 and 55. The valve 26 has the channels or recesses 51 and 56 in the bottom thereof disposed over the respective rows of ports. Thus, with the valve 26 in intermediate position, as shown in Fig. 1, the channel 51 establishes communication between the ports 48 and 49, and the channel 56 establishes communication between the ports 53 and 54. When the valve is slid to its forward position, the channel 51 establishes communication between the ports 49 and 50, and the channel 56 establishes communication between the ports 54 and 55. When the valve is slid to its rear position, the channel 51 establishes communication between the ports 47 and 48, and the channel 56 establishes communication between the ports 52 and 53. The forward position of the valve is the clear position, the intermediate position of the valve is the caution position, and the rear position of the valve is the danger position. The valve seat of the guide 25 also has a port 57, and the valve 26 has a channel 58 in the bottom thereof extending to the rear end of the valve to establish communication between the port 57 and the interior of the valve guide 25 and cylinder 31 in front of the piston 30, when the valve 26 is in either intermediate or forward position, said valve closing the port 57 when the valve is in rear or danger position.

The valve seat of the valve guide 36 is provided with a longitudinal row of ports 60, 61 and 62, and with a parallel row of ports 64, 65 and 66, the bottom of the valve 37 having the channels or recesses 63 and 67. When the valve 37 is in forward position, the channel 63 establishes communication between the ports 61 and 62, and the channel 67 establishes communication between the ports 65 and 66. However, when the valve 37 is in its rear position, the channel 63 establishes communication between the ports 60 and 61, while the channel 67 establishes communication between the ports 64 and 65. The seat of the guide 36 also has a port 68, and the valve 37 has the passage or port 69 to register with the port 68, when the valve 37 is in its forward position, to establish communication between said port 68 and the interior of the guide 36 and cylinder 42 in front of the piston 41.

A passage 70 connects the ports 47 and 49 and the port 68. A passage 71 connects the ports 48 and 60. A passage 72 connects the port 50 with a port opening through the valve guide 36 into the chamber within said valve guide and cylinder 42 in front of the piston 41. A passage 73 connects the ports 52 and 54 and the port 64. A vent passage 74 opening into the atmosphere communicates with the port 53. The port 55 communicates with a port or passage 75 opening through the valve guide 25 into the chamber within said guide and the cylinder 31 in front of the piston 30. A passage 76 connects the ports 57 and 66. A passage 77 connects the port 61 with an expansion tank or reduction reservoir 78. A vent passage 79 communicating with the atmosphere communicates with the port 62, and a pipe 80 communicates with the port 65. The passages 70, 71, 72, 73, 74, 75, 76, 77 and 79, although shown as pipes in Fig. 1, are formed in the blocks 22 and 24 by means of holes and channels provided in said blocks, as shown in Figs. 3 to 8, inclusive.

An automatic valve device 81 is provided to cut off the air (from the main reservoir pipe 35) to the engineer's brake valve 82, under certain conditions, as will hereinafter more fully appear, in order to prevent the valve 82 from being operated to deliver air from the main reservoir into the train pipe. The valve device 81 includes a valve casing 83 and a valve 84 therein having its stem connected to a piston 85 working in a cylinder 86. A spring 87 is provided to move the piston 85 and seat the valve 84, and the pipe 80 is connected to the cylinder 86 to admit air to said cylinder for moving the piston 85 against the action of the spring to open the valve 84. The casing 83 is interposed between the main reservoir pipe 35 and the engineer's brake valve 82. When air is admitted into the cylinder 86 from the pipe 80, to move the piston 85 against the action of the spring 87, the valve 84 is opened so that air can flow from the pipe 35 to the brake valve 82 in order that air can be let into the train pipe as usual. When the air can escape from the cylinder 86 through the pipe 80, the spring 87 seats the valve 84 and prevents the air from reaching the brake valve 82 from the main reservoir pipe 35.

In order to obtain a predetermined reduction in the train pipe pressure, such as for a service or caution application of the brakes, an equalizing reservoir 89 is connected by a pipe 88 with the passage 70 and with a differential valve device 90. Said valve device comprises a combined valve casing and cylinder 91 in which a piston 92 works, the pipe 88 being connected to the casing at one side of the piston, and a pipe 93 being connected to the casing at the opposite side of the piston. Said pipe 93 is connected to the passage 72. The casing 91 has an outlet 94 communicating with the atmosphere at the same side of the piston as the pipe 93, and a valve 95 carried by the piston normally seats over the outlet 94. The passage 72 receives air from the train pipe 44 through the chamber of the valve guide 36, so that the train pipe pressure is exerted against the piston 92 tending to move the piston and valve away from the outlet or port 94. However, under certain conditions, as will hereinafter more fully appear, air flowing through the pipe 88 is admitted to the casing 91 so as to be effective for holding the valve 95 closed.

A speed controlled valve device 96 is disposed between the pipes 35 and 46 to control the flow of air into and out of the cylinder 42. Said device 96 comprises a casing 97 having the port 98 in communication with the pipe 46, and the port 101 in communication with the main reservoir pipe 35. The casing 97 has a vent or outlet port 100 communicating with the atmosphere, and alternately seating valves 102 and 103 are mounted for reciprocation within said casing. When the valves are raised as seen in Fig. 1, the valve 103 seats upwardly between the ports 98 and 100, thereby establishing communication between the ports 98 and 101, for the flow of air from the main reservoir pipe 35 into the cylinder 42 to move the piston 41 forwardly. When the valves 102 and 103 move downwardly, the valve 102 seats between the ports 98 and 101, and the valve 103 opens, thereby connecting the pipe 46 with the discharge port 100, so that the air in the cylinder 42 behind the piston 41 is discharged to the atmosphere.

The valve casing 97 is secured to the block 24 at one side thereof, and the actuating means for said valves 102 and 103 includes a lever 104 fulcrumed to the block 24 below the valve casing 97 and pivotally connected with the valve 103. A link 105 connects the lever 104 and a bell crank lever 107 fulcrumed to the block 24 above the valve casing 97, and the link 105 includes a rotatable adjusting screw 106 to adjust the parts relatively to one another. The lever 107 carries an armature 108 located within the magnetic influence of the electromagnet 109 mounted on the block 24, whereby when said electromagnet is energized to attract the armature 108, the lever 104 is raised to seat the valve 103 and open the valve 102, whereas when the electromagnet is deenergized, the valves 102 and 103 will drop, seating the valve 102 and opening the valve 103.

The valve 26 and piston 30 are under the control of a pair of pneumatic signal controlled devices, one for clear conditions and the other for caution conditions. Such pneumatic clear and caution devices comprise the respective cylinders 110 and 111 arranged in alinement with the cylinder 31, piston 30 and corresponding parts, with the cylinder 110 between the cylinder 111 and block 22. Pistons 112 and 113 are disposed in the respective cylinders 110 and 111, and are of larger diameter than the piston 30, and said pistons 112 and 113 have the respective piston rods or stems 114 and 115 projecting through the forward ends of the corresponding cylinders. The forward ends of the cylinders 110 and 111 have vent ports 116 for the free egress and ingress of air.

The operative connection between the pistons 30, 112 and 113 includes longitudinal slide rods 117 disposed at opposite sides of each of the cylinders 110 and 111 and slidable through guides 118. Yokes 119 and 120 are secured to the forward and rear ends of the forward rods 117, and extend across the front and rear ends of the cylinder 110, to provide a slide surrounding said cylinder, the valve rod 114 having its forward end secured to the yoke 119 so that the forward slide is movable with the piston 112. Yokes 121 and 122 are secured to the forward and rear ends of the rear rods 117 in front and in rear of the cylinder 111, and form with said rods a slide surrounding the cylinder 111. The forward end of the piston rod 115 is secured to the yoke 121 so that the rear slide is movable with the piston 113. The push rod 32 is adapted to contact with the yoke 119 or the end of the piston rod 114, and the yokes 120 and 121 of the two slides are connected to limit the separation thereof, whereby the forward slide can be pulled forwardly independently of the rear slide under clear conditions, and, under danger conditions, the forward slide will push the rear slide rearwardly. Thus, bolts 123 are secured in the yoke 121 and slidable in the yoke 120, and their heads serve as stops for the contact of the yoke 120 to limit the separation of said yokes 120 and 121, as seen in Fig. 2. The piston 112, like the piston 30 and valve 26, has three positions, and moves through a greater distance than the piston 113, which is limited in its forward movement.

When air is admitted into the cylinder 110 behind the piston 112, said piston is moved to its forward position, and the yoke 119 contacting with the rod 32 will push the piston 30 and slide 26 to their forward position, even against the air pressure against the forward face of the piston 30 from the pipe 35, inasmuch as the piston 112 is of larger diameter than the piston 30, so that equal air pressures applied to said pistons in opposite directions will slide the parts forwardly. If the parts had previously been in danger position, the yoke 120 engaging the heads of the bolts 123 will pull the yoke 121 forwardly, thereby moving the piston 113 to its forward position, as seen in Figs. 2 and 3. If air pressure is effective in the cylinder 111 behind the piston 113, said piston is moved to its forward position, and if the air can escape from the cylinder 110, the air pressure against the piston 30 will move the piston 30 and valve 26 rearwardly to intermediate position, the rod 32 pushing the yoke 119 and piston 112 rearwardly to intermediate position, until the yoke 120 contacts with the yoke 121. The piston 113 being of larger diameter than the piston 30 will prevent further rearward movement of the parts with main reservoir pressure exerted against the opposite faces of the pistons 30 and 113, and, under these conditions (caution), the valve 26 is maintained in intermediate or caution position. When air can escape from both cylinders 110 and 111, the piston 30 can move to its rear position, the rod 32 pushing the yoke 119 and piston 112 to their rear position, and the yoke 120 pushing the yoke 121 and piston 113 to their rear position. This is the danger position of the parts.

A bleed valve 124 is provided for bleeding the air from the train pipe when the piston 30 moves the pistons 112 and 113 to rear positions, so as to provide an emergency application of the brakes. The valve 124 comprises a casing 125 secured on the base 23 in rear of the cylinder 111, and said casing has an air discharge port or outlet 126 across which a valve member 127 is normally seated by pressure from the pipe 93 which is connected to said casing. The valve member 127 is carried by a piston 128 slidable in a guide cylinder 129 secured in the casing 125, and a cap 130 is secured on said cylinder, the piston being perforated for the passage of air through the piston behind same. The yoke 122 carries a lug or finger 131 projecting rearwardly therefrom to contact with the valve member 127 and unseat the valve member when the piston 113 is moved to its rear position, thereby permitting the train pipe air to escape through the pipe 93 to the atmosphere.

A cut-out valve 132 is provided in the pipe 93, having a handle 133, whereby the bleed valve 124 can be rendered ineffective, by closing the valve 132, it being apparent that when the valve 132 is closed, air cannot escape from the pipe 93 through the valve 124.

The flow of air into and out of the cylinders 110 and 111 is controlled by the solenoids or electromagnets 134 and 135, respectively, of the electrical equipment, and the details will appear presently.

Tubular or hollow pedestals 136 have base flanges secured on the cylinders 110 and 111, and valve casings 137 are fitted within said pedestals in the manner of cores. Tubular cores 138 for the solenoids 134 have their lower ends screw-threaded into the upper ends of the pedestals 136, the solenoids being wound around said cores 138 and seating on disks or plates 139 secured on the cores 138 immediately above the pedestals 136. Disks or plates 140 are secured on the upper ends of the cores 138, and said disks or plates 139 and 140 provide the lower and upper heads for the solenoids. The pedestals 136 have outstanding flanges 141 below the solenoids, for the screw-threaded connection of the lower ends of casings 142 enclosing the solenoids, said casings having upper screw caps 143 which can be removed for access to the armatures 144 disposed below said caps. The armatures 144 are disks disposed above the solenoids or electromagnets 134 and 135.

Each valve casing 137 has a passage 145 communicating at one end with a chamber 146 formed in the top of the corresponding cylinder (110 or 111), and said cylinder has a passage 147 between the chamber 146 and the cylinder chamber in rear of the piston. The casing 137 has the opposite valve seats 148 and the passage 145 communicates with the valve casing 137 between said valve seats. A rod or stem 149 slidable in the tubular core 138 has its upper end secured to the armature 144, and is formed at its lower end with a valve member 149' to bear on the upper seat 148. The valve casing 137 and pedestal 136 have a vent port 150 leading to the atmosphere from above the upper seat 148, and the casing 137 has a bore or chamber 151 below the lower seat 148 extending to the lower end of said casing. A valve member 152 is secured to the lower end of the rod 149 to seat upwardly against the lower seat 148, the valve members 149' and 152 seating alternately. The casing 137 has a port 153 communicating with the chamber 151 and a branch of the main reservoir pipe 35 is connected to the pedestal 136 in communication with the port 153 for the admission of air from the main reservoir into the chamber 151. A coiled spring 154 is confined between the valve member 152 and a plug 155 screwed into the lower end of the chamber 151 for raising the valve members 149' and 152, rod 149 and armature 144, when the electromagnet 134 or 135 is deenergized.

The controlling valves of the cylinders 110 and 111 are thus controlled electromagnetically, the operation of the electromagnetic valve of each cylinder being the same. Thus, when the electromagnet 134 or 135 is energized, the armature 144 is attracted downwardly and moves the rod 149 downwardly to seat the valve member 149' on the upper seat and to unseat the lower valve member 152. Air from the main reservoir pipe 35 can then flow through the chamber 151, passage 145, chamber 146 and passage 147 into the corresponding cylinder to move the piston forwardly. When the electromagnet is deenergized, the spring 154 raises the valve members and armature, to seat the valve member 152 against the lower seat 148 and to unseat the valve member 149'. The air from the pipe 35 is therefore shut off from the passage 145, and the air from the cylinder can flow through the passage 147, chamber 146, passage 145 and port 150 to the atmosphere, to permit the piston to move rearwardly.

Binding posts 156 for the terminals of the electromagnets 134 and 135 are secured through the flanges 141, as shown, for the convenient connection of the wires or conductors with said electromagnets.

In order to open an electrical circuit, for purposes which will appear hereinafter, when the pistons 30, 112 and 113 are moved to their rear position, the switch 157 is provided, being carried by the cylinder 110, or other suitable part in rear of the yoke 119, and a piece 158 is secured on the yoke 119 to contact with said switch and open it when the yoke 119 is moved to its rear position.

OPERATION OF PNEUMATIC EQUIPMENT

*Clear conditions.*—The electromagnet 134 is energized when clear or normal running conditions exist. The magnet 109 being energized, because of train speed below the prescribed speed limit, will attract the armature 108 so as to seat the valve 103 and unseat the valve 102, and air flows from the main reservoir pipe 35 through the pipe 46 into the cylinder 42 so as to move the piston 41 and valve 37 forwardly, as seen in Figs. 1, 3 and 5. The magnet 134 being energized will attract its armature 144 to seat the valve 149' and unseat the valve 152, whereby air flows from the main reservoir pipe 35 through the chamber 151, passage 145, chamber 146, and passage 147 into the cylinder 110, thereby forcing the piston 112 forwardly. The yoke 119 will push the rod 32, piston 30 and valve 26 to the forward position, as seen in Fig. 3. The channel 51 of the valve 26 establishes communication between the ports 49 and 50, and the channel 56 of said valve establishes communication between the ports 54 and 55. The channel 63 of the valve 37 establishes communication between the ports 61 and 62, and the channel 67 establishes communication between the ports 65 and 66, the passage 69 registering with the port 68. Air from the main reservoir pipe 35 flows into the valve guide 25 in front of the piston 30 and from thence flows through the port 57, which is open in the forward position of the valve 26, into the pipe 76. The channel 67 in establishing communication between the ports 65 and 66 will deliver the air from the pipe 76 into the pipe 80, so that air from the main reservoir flows into the cylinder, moving the piston 85 so as to open the valve 84. This permits air from the main reservoir to flow to the engineer's brake valve 82 in order that air can be supplied to the train pipe for releasing the brakes under clear conditions. The main reservoir air from within the valve guide 25 also flows through the passage 75, port 55, channel 56 and port 54 into the pipe 73 leading to the port 64 which is closed by the valve 37 in its forward position. Air from the train pipe 44 flows into the valve guide 36, tending to move the piston 41 rearwardly, but the main reservoir pressure being exerted against the piston from the rear, will hold the piston 41 and valve 37 in forward position. Air flows from within the valve guide 36 through the passage 72 from which the pipe 93 extends to the bleed valve 124, and the pipe 93 also leads to the casing 91 of the differential valve device 90 under the piston 92, so that train pipe pressure is exerted upwardly against the piston 92. Also, the channel 51 connecting the ports 49 and 50, will permit the air to pass from the passage 72 through the port 50, channel 51 and port 49 into the passage 70. With the valve 37 in forward position, air can also flow from the train pipe 44 through the passage 69 and port 68 into the passage 70. From the passage 70, through either connection with the train pipe, the air can flow through the pipe 88 into the equalizing reservoir 89 and into the upper portion of the casing 91 to move the piston 92 downwardly so as to seat the valve 95. It will be noted that train pipe pressure is exerted against the piston 92 from above and below, and the downward pressure on the piston 92 and valve 95 will be greater than the upward pressure, because of the weight of the parts, so that the valve is held closed under equal pressures through the pipes 88 and 93. The air can escape from the expansion tank or reduction reservoir 78 through the passage 77, port 61, channel 63, port 62 and vent passage 79 to the atmosphere, thereby bringing the air in said tank to atmospheric pressure.

Under such conditions, the engineer can apply and release the brakes at will by the operation of the brake valve 82 as usual.

*Caution conditions.*—When the magnet 135 is energized and the magnet 134 deenergized, caution conditions exist. The magnet 134 releases its armature 144 so that the corresponding spring 154 seats the valve 152 and unseats the valve 149' of the magnet 134, thereby shutting off main reservoir air from the cylinder 110, and connecting said cylinder by way of the passage 147, chamber 146, passage 145 and port 150, with the atmosphere, so that the air is discharged from said cylinder, whereas the magnet 135 being energized will hold the valve 149' thereof closed and the valve 152 open, so that air flows from the main reservoir pipe 35 into the cylinder 111. Consequently, the piston 113 is moved to or held in forward position, as seen in Fig. 1, and the pressure on the piston 30 from the main reservoir pipe 35 will move said piston 30 and valve 26 rearwardly to intermediate or caution position, the rod 32 pushing the yoke 119 and piston rod or stem 114 rearwardly to intermediate position, as seen in Fig. 1. The yoke 120 contacts with the yoke 121 of the piston 113, thereby limiting the rearward movement of the pistons 30 and 112 and the valve 26. The pressure against the piston 113 will prevent further rearward movement of the piston 30, said piston 113 being of larger diameter than the piston 30, and both being under main reservoir pressure. Thus, the deenergization of the magnet 134 permits the piston 30 and valve 26 to move rearwardly, but the energization of the magnet 135 limits such rearward movement to intermediate or caution position. The valve 26 is now in intermediate or caution position, as shown in Figs. 1 and 4, with the channel 51 in registration with the ports 48 and 49, and with the channel 56 in registration with the ports 53 and 54.

The ports 50 and 55 are now closed by the valve 26, and the passage 70, which still communicates with the train pipe by way of the port 68 and passage 69, is now connected by way of the port 49, channel 51 and port 48, with the passage 71 and port 60, said port 60 being closed by the valve 37 when it is in forward position. The passage 73 is now connected by way of the port 54, channel 56 and port 53 with the vent passage 74. The pipe 76 still receives main reservoir air by way of the channel 58 and port 57, to hold the valve 84 open.

Therefore, with the valve 26 in intermediate position and the valve 37 in forward position, the brakes can still be applied and released by the operation of the engineer's brake valve 82.

The valve device 21 is speed controlled, however, to require the train or vehicle to travel below a predetermined maximum speed under caution conditions. This is accomplished by the control of the magnet 109 by certain speed-controlled electrical circuits. The magnet 109, as will hereinafter more fully appear, is energized when the train is travelling below the predetermined maximum speed, and when such speed is exceeded, the magnet 109 becomes deenergized, thereby releasing the armature 108 and the valve 103 moves open while the valve 102 closes. This shuts off the air from the cylinder 42, and such cylinder is connected to atmosphere by way of the pipe 46, passage 98 and port 100, so that train pipe pressure exerted against the piston 41 will move said piston and valve rearwardly, thereby closing the ports 62, 66 and 68, and the channel 63 registers with the ports 60 and 61, while the channel 67 registers with the ports 64 and 65. The valve 84 now closes, to shut off main reservoir air from the engineer's brake valve 82, inasmuch as the air can escape from the cylinder 86 by way of the pipe 80, port 65, channel 67, port 64, passage 73, port 54, channel 56, port 53 and passage 74, to the atmosphere, so that the spring 87 closes the valve 84. The releasing of the brakes, under such conditions, is therefore taken from the hands of the engineer. Furthermore, a predetermined reduction in train pipe pressure is obtained, thereby providing a service application of the brakes, until the speed of the train is reduced below the predetermined maximum under caution control. The port 68 being closed in the rear position of the valve 37, will prevent train pipe air from flowing through the passage 70 to the reservoir 89 and casing 91, and the port 50 is also closed to prevent train pipe air from flowing from the passage 72 to the passage 70 by way of the valve 26. The air from the reservoir 89 now flows into the tank or reduction reservoir 78 by way of the pipe 88, passage 70, port 49, channel 51, port 48, passage 71, port 60, channel 63, port 61, and passage 77. The reduction reservoir 78 being under atmospheric pressure and the equalizing reservoir 89 being under train pipe pressure will result in the flow of air from the equalizing reservoir 89 to the reduction reservoir 78 until the pressures in the two reservoirs are equalized. This will reduce the pressure accordingly on the top of the piston 92, and train pipe pressure is still effective against the bottom of the piston 92, by way of the passage 72 and pipe 93. Consequently, the piston 92 is raised to open the valve 95, and air is discharged from the train pipe through the passage 72, pipe 93 and port 94 to the atmosphere. This reduces the train pipe pressure, and as soon as the train pipe pressure is reduced sufficiently to balance the pressure in the reduction reservoir 78 and equalizing reservoir 89, the air pressures on the piston 92 from above and below will be equalized, so that the valve 95 will again be closed. The amount of reduction in train pipe pressure will depend on the relative sizes of the reservoirs 89 and 78, and the larger the reservoir 78 is compared with the reservoir 89, the greater will be the reduction in pressure.

When the speed of the train is reduced below the predetermined maximum under caution conditions, the magnet 109 is reenergized, to open the valve 102 and close the valve 103, so that air from the main reservoir pipe 35 again flows into the cylinder 42 to move the piston 41 and valve 37 forwardly. Air from the reservoir 78 then escapes to the atmosphere by way of the passage 77, port 61, channel 63, port 62 and vent passage 79. Air from the main reservoir flows to the cylinder 86 by way of the channel 58, port 57, passage 76, port 66, channel 67, port 65 and pipe 80, so that the valve 84 is again opened. This enables the engineer to recharge the train pipe by way of the brake valve 82, and the reservoir 89 is also recharged to full train pipe pressure, as when the brakes are released, the air from the train pipe flows through the passage 69, port 68, passage 70 and pipe 88 into the reservoir 89.

Should the magnet 109 become deenergized under clear conditions, which will occur whenever the train travels above the predetermined maximum caution speed, the valve 37 and piston 41 will move to rear position, but the valve 26 is in forward or clear position, which will prevent the reduction in train pipe pressure. Thus, considering the valve 26 in its forward position, and the valve 37 in its rear position, the ports 47, 48, 52 and 53 are closed by the valve 26, and the ports 62, 66 and 68 are closed by the valve 37. Air can flow from the main reservoir pipe 35 to the cylinder 86, to hold the valve 84 open, such air flowing by way of the passage 75, port 55, channel 56, port 54, passage 73, port 64, channel 67, port 65 and pipe 80 to the cylinder 86. The valve 84 is thus held open even though the valve 37 moves rearwardly, with the valve 26 in forward position. Although the passage 70 is closed at the port 68, it receives train pipe pressure by way of the passage 72, port 50, channel 51 and port 49, so as to keep the reservoir 89 under full train pipe pressure, and the piston 92 and valve 95 are held down. There is therefore no reduction in train pipe pressure even though the valve 37 moves rearwardly while the valve 26 is in forward or clear position, nor is the main reservoir air cut off from the brake valve 82.

*Danger conditions.*—When both magnets 134 and 135 are deenergized, danger conditions exist, and the air can escape from both cylinders 110 and 111 so that main reservoir pressure will move the piston 30 and valve 26 to rear position, the piston 112 being moved by the yoke 119 which is moved by the push rod 32, and the yoke 120 moving the yoke 121 and piston 113, so that all three pistons are in rear position as well as the valve 26. The lug 131 will contact with and open the valve member 127, which will bleed the air from the train pipe, to cause an emergency application of the brakes, the air flowing from the train pipe 44 through the passage 72, pipe 93 and port 126 to the atmosphere.

The switch 157 is connected in series with the magnet 109, as will hereinafter more fully appear in considering the electrical equipment, whereby when the piston 30 moves to rear position, the piece 158 on the yoke 119 will open the switch 157, thereby immediately deenergizing the magnet 109, and closing the valve 102 and opening the valve 103, so that the piston 41 is moved rearwardly by the train pipe pressure, and the valve 84 is closed by the flow of air from the cylinder 86 through the pipe 80, port 65, channel 67, port 64, passage 73, port 52, channel 56, port 53 and vent passage 74. In the rear position of the valve 26, the port 57 is closed to prevent main reservoir air from flowing through the passage 76, so that there is an additional precaution in shutting off the main reservoir pressure from the piston 85 under danger conditions, to assure of the valve 84 being closed, and air from the main reservoir cannot be passed through the brake valve 82.

If, instead of an emergency application of the brakes to cause a sudden stop of the train, by the opening of the bleed valve 124, it is desired to only partially reduce the train pipe pressure, then the valve 132 is closed, to prevent the escape of air through the bleed valve 124, when the piston 30 and valve 26 move to rear position. The air from the train pipe will now escape past the valve 95 in substantially the same manner as under caution conditions. Thus, air from the equalizing reservoir 89 will flow into the reduction reservoir 78, to reduce the pressure above the piston 92, the air flowing through the pipe 88, passage 70, port 47 (with valve 26 in rear position), channel 51, port 48, passage 71, port 60, channel 63, port 61 and passage 77. The passage 70 is closed at the port 68 by the valve 37 when in rear position, and train pipe pressure will move the piston 92 upwardly to open the valve 95, the train pipe air flowing through the passage 72 and pipe 93 into the casing 91 below the piston 92. When said piston and valve are raised, the air from the train pipe passes through the port 94 to the atmosphere, thereby gradually applying the brakes until the train pipe pressure is reduced to the reduced pressure in the reservoir 89, when the equalized pressures on the piston 92 from above and below will again close the valve 95. The air is discharged from the cylinder 86 to the atmosphere, the same as under emergency danger conditions, to close the valve 84, and the port 57 is closed to prevent the main reservoir air flowing through the passage 76 to the cylinder 86.

The switch 157 is held open when the valve 26 is in danger position to keep the magnet 109 deenergized.

It will therefore be seen that when the valve 132 is open, an emergency application of the brakes is obtained under danger conditions, by bleeding the train pipe air to the atmosphere, whereas when said valve 132 is closed, only a partial reduction in train pipe pressure occurs, to retard the train with a less sudden action.

*Service brake application mechanism*

In Fig. 10 there is illustrated a mechanism for obtaining a graduated application of the brakes by a predetermined manner of reducing the train pipe pressure. Only such portions of the valve devices 20 and 21 are shown as are pertinent to the mechanism under consideration.

The passage 77 leading from the port 61 of the valve device 21 is connected by a pipe 160 with one end of the cylinder 162 of a primary pressure reducer 161. The cylinder 162 provides a primary or first expansion chamber or reduction reservoir having a predetermined capacity with relation to the equalizing reservoir 89. This takes the place of the expansion tank or reduction reservoir 78 (see Fig. 1) and constitutes the first reduction reservoir. The device 161 has a valve casing 164 extending from the end of the cylinder 162 opposite to the pipe 160, and a piston valve 163 is slidable in the casing 164, while a piston 165 is slidable in the cylinder 162 and is normally moved toward the pipe 160 by a spring 167. The cylinder 162 has a vent port 166 at that side of the piston opposite to the pipe 160. The casing 164 has the ports 168, 169 and 170, and the valve 163 has the channel 171 to alternately establish communication between the port 170 and the ports 168 and 169. A branch of the main reservoir pipe 35 is connected to the casing 164 in communication with the port 168, the port 169 opening into the atmosphere, and a pipe 172 is connected to the casing 164 in communication with the port 170 and leads to a secondary pressure reducing device 173 which will be described presently.

The secondary device 173 for obtaining a second reduction in train pipe pressure after the primary reduction, includes an expansion chamber or cylinder 174 having the pipe 172 connected thereto at one end, and having the valve casing 175 at the opposite end in which the piston valve 176 is slidable. A piston 177 is slidable in the cylinder 174, and is moved toward the pipe 172 by the spring 179.

In both of the devices 161 and 173 the pistons 165 and 177 have rods or stems 180 secured to the piston valves so that said valves move with the pistons. The movement of the pistons and valves is limited by longitudinal grooves 181 in the valves receiving screws or other stops 182 engaged in the casings 164 and 175.

The valve casing 175 has a port 183 connected by a pipe 184 with the reservoir 89, and the casing 175 has a vent port 185 communicating with the atmosphere. Between the ports 183 and 185 the casing 175 has a port 186 connected by a pipe 187 with an expansion tank or second reduction reservoir 188. The valve 176 has a channel 189 to alternately establish communication between the port 186 and ports 183 and 185.

A restricted flow valve 190 is disposed in the pipe 172 between the valve casing 164 and cylinder 174, and has a casing 191 provided with a valve seat 192 on which a valve member 193 is seatable toward the cylinder 174. Said valve member has a restricted aperture 194 extending therethrough whereby the flow of air through the pipe 172 into the cylinder 174 is restricted, whereas the valve member 193 can unseat for the free flow of air from the cylinder 174 into the pipe 172.

The operation of the devices 20 and 21 is the same as hereinbefore described, and the additional mechanism takes the place of the tank or reduction reservoir 78, in order to provide for successive reductions in train pipe pressure, instead of a single reduction. The reduction in train pipe pressure is obtained with the valve 26 in either intermediate position as shown in Fig. 10, or with said valve in rear position, inasmuch as the channel 51 of the valve 26 connects the passages 70 and 71 in either of such positions of the valve, it being noted that the passage 70 has branches leading to the ports 47 and 49. Therefore, in the intermediate position of the valve 26 the channel 51 registers with the ports 48 and 49 to connect the passages 70 and 71, and in the rear position of the valve 26 the channel 51 registers with the ports 47 and 48 to connect said passages 70 and 71. However, as hereinbefore described, if the bleed valve 124 is operative, the emergency application of the brakes is obtained in the danger position of the valve 26.

The operation of the differential valve device 90 is the same as hereinbefore described, and the reservoir 89 is charged with train pipe pressure when the valve 26 is in forward position.

With the valve 37 in forward position, the channel 63 registers with the ports 61 and 62, so that the air from the cylinder 162 can pass through the pipe 160, passage 77, port 61, channel 63 and port 62 to the atmosphere. The spring 167 will therefore move the piston 165 rearwardly. The valve 163 is moved rearwardly with the piston 165 so that the channel 171 registers with the ports 169 and 170. This permits the air to escape from the cylinder 174 to the atmosphere by way of the pipe 172 (the valve member 193 opening), the port 170, channel 171 and port 169. The spring 179 therefore moves the piston 177 and valve 176 rearwardly, so that the channel 189 registers with the ports 185 and 186. The air in the second reduction reservoir 188 can then escape to the atmosphere by way of the pipe 187, port 186, channel 189 and port 185, so that the air in said reservoir will be at atmospheric pressure.

Now, with the valve 26 in either intermediate or rear position, so that the passages 70 and 71 are connected, the movement of the valve 37 to rear position will result in the reduction in train pipe pressure. The valve 37 closes the port 68 to shut off train pipe air from the passage 70 and reservoir 89. The air in the reservoir 89 and casing 91 above the piston 92, which was under train pipe pressure before the closing of the ports 50 and 68, flows into the expansion chamber or cylinder 162, by way of the pipe 88, passage 70, ports 47 or 49, channel 51, port 48, passage 71, port 60, channel 63, port 61, passage 77 and pipe 160. This flow of air from the equalizing reservoir 89 to the chamber or cylinder 162 constituting the first reduction reservoir will reduce the pressure above the piston 92, so that the train pipe pressure exerted upwardly against said piston will move the piston and valve 95 upwardly, thereby opening said valve so that the air can escape from the train pipe to the atmosphere by way of the passage 72, pipe 93 and port 94. However, as soon as the train pipe pressure is reduced to an amount equal to the reduced pressure in the reservoir 89, the valve 95 is again seated inasmuch as the pressure above the piston 92 is equal to or slightly greater than the pressure underneath said piston, and further escape of air from the train pipe to the atmosphere is interrupted for an interval. The forward movement of the piston 165 resulting from the flow of air into the cylinder 162 from the reservoir 89, will move the valve 163 forwardly, so that the channel 171 registers with the ports 168 and 170. This will connect the pipe 172 with the main reservoir pipe 35, so that air flows from the main reservoir through the pipe 35, port 168, channel 171, and port 170 into the pipe 172. The air from the main reservoir is delivered through the pipe 172 into the cylinder or chamber 174, but the flow is restricted inasmuch as the air has to pass through the restricted aperture 194 in the valve member 193. The gradual flow of air into the cylinder 174 will move the piston 177 forwardly, but an interval of time is required before the piston 177 and valve 176 reach forward position to bring the channel 189 in registration with the ports 183 and 186. The length of the interval of time will depend on the size of the aperture 194, and may be increased by connecting a chamber or tank 195 with the cylinder 174, inasmuch as the tank 195 must be filled in addition to the space in the cylinder 174 in rear of the piston 177. The cylinder 134, with the tank 195, provide a timing reservoir, the aperture 194 determining the rate of flow of pressure fluid and the capacity of the timing reservoir determining the amount of flow necessary to move the piston 177 and valve 176.

After the flow of air from the main reservoir through the pipe 172 into the cylinder 174 has continued for a sufficient interval of time (several seconds or a fraction of a minute in practice), the valve 176 establishes communication between the pipes 184 and 187. Consequently, a further reduction in the reservoir 89 is obtained, by the flow of air from said reservoir into the tank or second reduction reservoir 188, by way of the pipe 184, port 183, channel 189, port 186 and pipe 187. The pressure in the reservoir 89 and casing 91 above the piston 92 is thus reduced below the previously reduced pressure in the train pipe, so that the piston 92 is again raised to open the valve 95 and permit air to discharge from the train pipe until the train pipe pressure is reduced a second time to the reduced pressure in the reservoir 89.

In this way, a primary reduction in train pipe pressure is obtained at once, to provide a slight application of the brakes, and then, after a predetermined interval, a second reduction in train pipe pressure is obtained, to apply the brakes further. These successive reductions in train pipe pressure will enable the train to be retarded without sudden jars or shocks, such as when an emergency brake application is made, and any number of pressure reduction devices may be used.

The amount of reduction in train pipe pressure the first time depends on the relative sizes of the reservoir 89 and cylinder or chamber 162, and the amount of reduction of train pipe pressure the second time depends on the size of the tank 188 relatively to the reservoir 89. The length of the interval of time between the reductions in train pipe pressure will depend on the size of the aperture 194 and the size of the tank 195 if such tank is used, and the number of reductions in pressure will depend on the number of pressure reduction devices used. The reservoir 89 and tanks 188 and 195, as shown in diagram, are smaller in proportion than they should be, and such reservoir and tanks may be of sufficient size to accomplish the results intended.

As hereinbefore described, when the valves 26 and 37 move to forward position, the piston 165 and valve 163 move to rear position, and the piston 177 and valve 176 then move to rear position. The air is discharged from the second reduction reservoir 188 to the atmosphere, and the reservoir 89 is again recharged with train pipe pressure.

*Electrical equipment*

Fig. 11 illustrates the electromagnets 109, 134 and 135 and the switch 157 in their circuits of the electrical equipment, whereby the magnet 134 is energized under clear conditions, the magnet 135 energized and the magnet 134 deenergized under caution conditions, both magnets 134 and 135 deenergized under danger conditions, and the magnet 109 deenergized above a predetermined maximum caution speed.

The electrical equipment is substantially the same as that disclosed in U. S. Letters Patent No. 1,695,931, issued December 18, 1928, on my application Serial No. 657,229, filed August 13, 1923, with some variations or modifications.

The electrical equipment carried by the locomotive or other car of the train, includes an alternating or pulsating current generator 210, which normally energizes a clear or running circuit including the conductor 211, contacts 270 of a speed controlled switch 271 operated by a speed governor 272, conductor 273, switch 212, conductor 213, switch 214, conductor 215, electromagnets 216 and 134 and lamp 218 connected in parallel, and conductor 219. The magnet 216 and switch 214 form a stick relay, whereby the magnet 216 being deenergized to let the switch 214 drop open, will keep such circuit open until the magnet 216 is energized by closing the circuit thereof along some other route.

Another normally energized circuit includes the generator 210, conductor 211, contacts 270, conductor 273, switch 220, conductor 221, switch 222, electromagnet 223 and conductor 219, and such circuit includes a shunt parallel with the switches 220 and 222, said shunt including the contacts 274 of the switch 271, conductor 224, switch 225 and conductor 226 connected to the magnet 223. The switch 222 is under the control of the magnet 223, and the switch 225 is under the control of the magnet 216.

When the switch 225 drops away from the conductor 224 it engages a conductor 228 connected in parallel through the electromagnet 135 and lamp 230 with the conductor 219.

When the switch 222 drops open by the deenergization of the magnet 223, said switch connects with a conductor 231 leading to the conductor 219 and having a lamp 232 therein. The lamps 218, 230 and 232 or other signalling or translating devices are for the purpose of indicating to the engineer or operator the various conditions, it being noted that the lamps 218 and 230 are parallel with the corresponding magnets 134 and 135. Thus, when the magnet 134 is energized, the lamp 218 is lighted to indicate clear conditions, and said lamp is white in color. When the magnet 135 is energized the lamp 230 is lighted to indicate caution conditions, and such lamp is preferably of green, orange, or other suitable color accordingly. The lamp 232 is of red color to indicate danger when lighted. Other signal devices can be used in lieu of the electric lamps for giving visual or audible signals or both.

The companion switches 212 and 220 are under the control of an electromagnet 233, which is normally energized, and which is deenergized whenever passing a control station of the track. This deenergization of the magnet 233 to release the switches 212 and 220 can be obtained in different ways, or said switches opened at each control station by suitable mechanism. As shown, an inductive device is employed for the purpose. Thus, the magnet 233 is connected in circuit with the secondary winding 234 of a step-up transformer 235 and the primary winding 236 of said transformer is continuously supplied with pulsating or alternating current from the generator 210 which is driven by a steam turbine or other prime mover on the vehicle. The circuit of the primary winding 236 includes the conductor 237, generator 210, conductor 211, a choke coil 238, conductor 239 and a condenser 240. The choke coil 238 is wound on a core 241, preferably having its poles or end portions directed downwardly, to pass closely over a stationary inert armature or choke coil core section 242 of iron or other magnetic material mounted on the track or road bed at each control station of the track. The armature or inductor 242 simply consists of a block or body of iron or other magnetic material mounted between the rails or at one side of the track, and the choke coil 238 and its core 241 are supported from the locomotive or vehicle so as to pass over the armature 242 in inductive relation therewith. Each armature 242 preferably rises a distance above the plane of the treads of the traffic rails R, whereby the inductive action between the choke coil and armature is greater than between the choke coil and rails at crossings or switches, in order that undesirable stops can be avoided in the movement of the choke coil over rails, bridges or other magnetic objects, inasmuch as the choke coil is only effective when passing over the armature 242, the clearance between the choke coil 241 and armature 242 being appreciably and sufficiently less than between the choke coil core and other iron or magnetic objects along the track, so that the desired action is only obtained when passing the armatures at control stations or points of the track.

The condenser 240 is of sufficient capacity to more than balance or neutralize the inductive reactance of the choke coil 238 under normal conditions. The capacity and inductive reactances balance one another substantially, although they are made not precisely equal for a purpose as will appear presently. While the train is running in a block between track armatures the capacity reactance of the primary circuit including the primary transformer winding 236, due to the condenser 240, more than offsets the inductive reactance due to the choke coil 238, and the current and electrical force of the primary circuit are almost or practically in phase with each other. When the choke coil passes over rails at a crossing or switch or over other iron or magnetic objects on the road bed flush with the rails or lower, the inductive reactance will be increased slightly, but, under normal conditions the capacity reactance is slightly greater than the inductive reactance so that when the choke coil passes over a rail or other magnetic object, other than the armature 242, then the inductive and capacity reactances approach or obtain an even balance, so that the impedance approaches or is closely equal to the circuit resistance. The impedance thus decreases when the choke coil passes over a rail or similar object owing to the inductive reactance becoming equal to or nearly to the capacity reactance. When the choke coil passes over a track armature 242, the air gap between the ends of the core 241 is substantially bridged by the armature 242, thus completing a magnetic circuit of low reluctance for the choke coil and greatly increasing the inductive reactance thereof. The core 241 comes closer to the armature 242 than to the rails at a crossing or other magnetic objects on the road bed, and consequently the impedance of the primary circuit, including the winding 236, is greatly increased at this time, and the current flowing through the primary circuit is therefore markedly cut down by the track armature.

Inasmuch as current is induced in the secondary circuit, including the winding 234 and magnet 233, from the primary circuit, the drop in the secondary circuit will be amplified. The normal flow of current through the primary of the transformer 235 induces a secondary current through the magnet 233 sufficient to insure that the switches 212 and 220 will remain closed while the train is travelling in a block between track armatures, whereas when the choke coil 238 passes over a track armature 242, the drop in the primary current due to the considerable increase in impedance, produces a drop in the secondary circuit which is proportionally greater, with the result that the relay coil or magnet 233 is deenergized to release the switches 212 and 220.

Owing to the relatively large change in circuit conditions which is obtained with an arrangement of the above character, the normal current through the relay magnet or coil 233 may be maintained at a high value to insure that the magnet will not become accidentally deenergized, and yet the action of the track armatures 242 insures that the relay or magnet will be with certainty deenergized at the proper times. Therefore, whenever passing a control station or point of the track, the choke coil 238 passing over the armature 242, will result in the magnet 233 being deenergized and the switches 212 and 220 opened.

The magnet 233, as well as the magnets 216, 134, 223 and 135 are all alternating or fluctuating current magnets, inasmuch as the magnets are supplied with alternating or pulsating current.

In order to clear the vehicle equipment, a clearing switch 243 is provided to bridge the conductors 215 and 224 parallel with the switch 214. When the switch 243 is closed, the circuit includes the generator 210, conductor 211, contacts 274, conductor 224, switch 243, conductor 215, magnets 134 and 216 and conductor 219, so that the magnet 216 is reenergized to attract the switches 214 and 225 to restore clear conditions. The switch 243 is preferably under lock and key or otherwise arranged so that the vehicle equipment can only be cleared under proper authority or by complying with specified requirements.

For modifying the periodic control obtained by the movement of the choke coil past the track armatures, secondary control means is provided for closing holding circuits for the magnets 216 and 223 to obtain clear and caution or other corresponding conditions selectively. When passing a control station, so that the switches 212 and 220 drop open, it is necessary that the magnet 216 remain energized to preserve clear conditions, and if the magnet 216 becomes deenergized, it is necessary that the magnet 223 be energized to obtain caution conditions. This is due to the fact that the switch 212 moving open will open the circuit of the magnet 216, letting the switch 214 drop open, so that the magnet 216 as well as the magnet 134 will remain deenergized, even though the switch 212 is again closed when the choke coil leaves the armature 242. The switch 225 being dropped by the magnet 216 and the switch 220 being dropped by the magnet 233, will open the circuit of the magnet 223 so that said magnet will be deenergized. However, even though the switch 220 moves open, if the magnet 216 remains energized, the magnet 223 is supplied with current by way of the conductor 224, switch 225 and conductor 226 between the generator lead conductors 211 and 219.

The secondary control means include a partial circuit 244 carried by the train or vehicle and comprising a cable or conductor having extremely small resistance, said conductor or cable being of a good electrical conductor and being of sufficiently large cross-section so that its resistance is small enough for the purpose. The opposite ends of the conductor or partial circuit 244 are connected to wheels of the train separated longitudinally as far as practical. Thus, the forward end of the conductor 244 can be connected to the pilot or pony truck 245 of the locomotive, and the rear end of said conductor can be connected to the rear truck 246 of the tender, and although the rail R and the locomotive and tender electrically connect the ends of the conductor 244, such conductor is connected in parallel with the rail so that current supplied to the ends of the conductor 244 will not all follow the rail, and a small percentage of the current will flow along said conductor. Insulation can be provided between the locomotive and tender, but such insulation is not necessary, inasmuch as a few millivolts of current will flow in the conductor 244 out of say six or twelve volts supplied by the track battery as hereinafter described.

A galvanometer relay 247 is disposed in the conductor or partial circuit 244 and constitutes the controlling device for obtaining caution and clear or corresponding conditions in the vehicle equipment, said relay or devices 247 being sensitive to feeble electrical current (a few millivolts) flowing in the conductor 244, and includes a switch 248, which may be a pointer or arm of light weight so as to be moved one way or the other from neutral or intermediate position by polarized current flowing through the conductor 244. The relay 247 is so constructed or adjusted that under normal conditions the switch 248 will remain in neutral position, and when a feeble current flows along the conductor 244 in either direction, the switch 248 is moved in the corresponding direction from intermediate position. The relay 247 has a pair of contacts 249 and 250 at the opposite sides of the switch 248 to which the conductors 215 and 226 are connected, respectively, whereas the conductor 211 is connected to the switch 248, so that said switch, in contacting with the contact 249, will connect the conductors 219 and 215 parallel with the switches 212 and 214, and so that the switch 248 in engaging the contact 250 will connect the conductors 211 and 226 parallel with the switches 220 and 222 and the switch 225.

As hereinbefore described, the magnet 233 is deenergized whenever passing a control station, due to the action resulting from the choke coil 238 passing the armature 242, so that the switches 212 and 220 drop open, thereby opening the circuits of the magnets 216 and 223 through said switches 212 and 220, but the switch 248 of the secondary responsive device or relay 247 can establish alternate holding circuits for the magnets 216 and 223, in order that "danger", "caution" and "clear" conditions may be obtained in the vehicle or train equipment for effecting the stopping of the train, the travel of the train below a predetermined speed, or the retarding thereof if the train exceeds the given speed, and the permission to proceed unrestricted as to speed, which different conditions are briefly described as follows:

1. "Danger"—If, in passing an armature 242, the switch 248 remains in neutral position, with the switches 212 and 220 opened, the circuits of the magnets 216 and 223 are opened, so that said magnets become deenergized, and the switch 214 dropping open will also open the circuit of the magnet 134, thereby deenergizing the magnet 134 as well as the magnet 135 which is normally deenergized, and both magnets 134 and 135 being deenergized will produce a danger condition requiring the train to stop. The switches 214, 222 and 225 being released will remain open, even though the switches 212 and 220 are again closed after passing the armature 242. The magnets 216 and 223 therefore remain deenergized. The switch 222 being in its lower position will connect the conductors 221 and 231, so that the danger lamp 232 is lighted or other danger signal given, the circuit including the generator 210, conductor 211, contacts 270, conductor 273, switch 222, conductor 231 and lamp 232 therein, and conductor 219. The magnets 134 and 135 are thus both deenergized for establishing danger conditions, and the lamp or signal 232 indicates such condition.

2. "Caution"—If, when the choke coil 238 passes an armature 242 at a control station, with current flowing through the conductor or partial circuit 244 in one direction, so that the switch 248 is moved against the contact 250, when the switches 212 and 220 are opened, caution conditions will be established in the train equipment. The switch 212 being opened will deenergize the magnets 216 and 134, and the switches 220 and 225 being opened, would, under danger conditions, deenergize the magnet 223, but an alternate holding circuit for the magnet 223 is established by the switch 248 engaging the contact 250, such alternate holding circuit including the generator 210, conductor 211, switch 248, contact 250, conductor 226, magnet 223 and conductor 219. The magnet 223 is thus kept energized even though the switches 212, 214, 220 and 225 have been opened, thereby keeping the switch 222 raised. Then, when the switches 212 and 220 are again raised in leaving the control station, the switches 214 and 225 remain down because the magnet 216 remains deenergized. The circuit of the magnet 223 now includes the generator 210, conductor 211, contacts 270, conductor 273, switch 220, conductor 221, switch 222, magnet 223 and conductor 219, the same as under clear conditions, and the switch 225 being down in engagement with the conductor 228, will result in the magnet 135 and lamp 230 being energized to establish and maintain caution conditions. The circuit of the magnet 135 and lamp 230 includes the generator 210, conductor 211, contacts 270, conductor 273, switch 220, conductor 221, switch 222, conductor 226, switch 225, conductor 228, magnet 135 and lamp 230, and conductor 219. The magnet 134 is thus deenergized and the magnet 135 energized for caution conditions, with the caution lamp 230 lighted to indicate such conditions.

3. "Clear"—When passing a control station, should current flow through the conductor 244 in the opposite direction as compared with caution conditions, so that the switch 248 is moved against the contact 249, when the switches 212 and 220 drop open, then clear conditions are established or maintained. Thus, although the switches 212 and 220 drop open, the magnets 216 and 223 remain energized, by the establishment of an alternative holding circuit for the magnet 216. Such circuit includes the generator 210, conductor 211, switch 248, contact 249, conductor 215, magnets 216 and 134 and lamp 218, and conductor 219. Thus, with the switch 248 against the contact 249, the magnet 216 is kept energized while the choke coil passes the armature 242, to prevent the magnet 216 being deenergized while the switches 212 and 220 are open. Even though the switch 220 is opened, the switch 225 remains in engagement with the conductor 224, to keep the magnet 223 energized, the circuit of the magnet 223 (while the switch 220 is open) including the generator 210, conductor 211, contacts 274, conductor 224, switch 225, conductor 226, magnet 223 and conductor 219. Clear conditions are thus maintained, and if the train was proceeding under caution or danger conditions, the movement of the switch 248 against the contact 249 will reestablish clear conditions by energizing the magnets 216 and 134.

The arrangement is a normal danger one, inasmuch as danger conditions are established in the vehicle equipment when the choke coil 238 passes the armature 242, whereby the primary responsive element or magnet 233 becomes deenergized to release the switches 212 and 220, and current is required for the secondary responsive device or relay 247 to move the switch 248 one way or the other to provide for clear or caution conditions accordingly. The current for the conductor or partial circuit 224 is obtained from the track as will presently appear.

The track part of the apparatus at each control station comprises a partial circuit having its terminals connected to the rail R and supplied with polarized current from a track battery through a polarized reversing relay, whereby the control of the secondary responsive device or relay 247 is obtained without ramps, trips, or other elements or obstructions between the track and train other than the wheels of the trucks 245 and 246 and the rail R. The partial track circuit includes the conductors 251 and 252 connected at their opposite ends to the rail R at a suitable distance apart, preferably about the same distance as the ends of the conductor or partial circuit 244 are spaced apart. The conductor 251 is connected to contacts 253 and 254 of a polarized reversing relay, and the conductor 252 is connected to contacts 255 and 256 of such relay, the relay having polarized switches 257 and 258 which, when the relay is deenergized, are in normal neutral or intermediate position, with the switch 257 between the contacts 253 and 255 and with the switch 258 between the contacts 254 and 256. The switches 257 and 258 are connected to the opposite poles of the track battery 259 or other source of electrical current, and the switches are controlled by a magnet 260 which is connected in circuit with the wayside signal apparatus, whereby the magnet 260 is deenergized when danger track conditions exist, and so that the current flows through the magnet in one direction for clear conditions and flows through the magnet in the opposite direction for caution conditions. Thus, assuming for clear conditions, the current flows through the magnet 260 so as to move the switches 257 and 258 against the contacts 255 and 254, respectively, the flow of current from the battery 259 will be along the switch 258, contact 254, and conductor 251, and returning by way of the conductor 252, contact 255 and switch 257. Under caution conditions with the current flowing through the magnet 260 in the opposite direction, the switches 257 and 258 are moved against the contacts 253 and 256, whereby the current from the battery 259 flows by way of the switch 258, contact 256 and conductor 252, returning by way of the conductor 251, contact 253 and switch 257. Thus, by reversing the flow of current through the polarized track relay, the switches 257 and 258 of the relay alternately connect the conductors 251 and 252 with the opposite poles of the track battery 259, whereas when the track relay is deenergized, the conductors 251 and 252 are not only disconnected from one another but are also disconnected from the track battery.

It is preferable, although not necessary, to use an insulated joint 261 in the rail R between the opposite ends of the conductors 251 and 252, and to bridge the insulated joint by suitable resistance 262. Thus, although current can flow along the rail R between the conductors 251 and 252, such as in a signal circuit, the flow of current from the battery 259 through the partial track circuit will encounter the resistance 262 in flowing along the portion of the rail R between the opposite terminals of the conductors 251 and 252.

If the wayside signal apparatus is such that current flows through the rails, resulting in a portion of the current flowing through the conductor 244, the flow of current through such conductor is negligible so as not to affect the relay 247, whereas the current supplied by the battery 259 is of sufficient potential as to operate the relay 247 in a reliable manner.

OPERATION

*Normal running conditions.*—When the train is proceeding under normal running or clear conditions in a block between the armatures or inductors 242 the primary circuit from the generator 210 through the choke coil 238, condenser 240 and the primary winding 236 will be energized by normal current flow. As stated hereinbefore, the capacity, under such conditions, practically neutralizes the inductive reactance of the coil 238 in such a way as to permit a current of relatively high value to pass through the circuit. Moreover, when the coil 238 passes over rails or other magnetic objects at crossings and elsewhere, the impedance may even be decreased, to increase the current flow in the circuit, and therefore cause the switches 212 and 220 to stick more tightly against their contacts by the added energization of the magnet 233. Such magnet is therefore kept energized and the switches thereof closed by the induced current through the secondary of the transformer 235.

The normal clear circuit includes the generator 210, conductor 211, contacts 270, conductor 273, switch 212, conductor 213, switch 214, conductor 215, magnets 216 and 134 and lamp 218, and conductor 219, keeping the magnets 216 and 134 energized and the clear lamp 218 lighted. Another circuit includes the generator 210, conductor 211, contacts 270, conductor 273, switch 220, conductor 221, switch 222, magnet 223 and conductor 219, to keep the magnet 223 energized, and said magnet is disposed in another circuit including the generator 210, conductor 211, contacts 274, conductor 224, switch 225, conductor 226, magnet 223 and conductor 219.

When starting, with the magnets 216, 134 and 223 deenergized and the magnet 233 energized to close the switches 212 and 220, the clearing switch 243 is closed, thus completing the circuit including the generator 210, conductor 211, contacts 274, conductor 224, switch 243, conductor 215, magnets 216 and 134 and lamp 218, and conductor 219. The switches 214 and 225 are therefore raised, and the magnet 223 is thereby energized, the circuit of the magnet 223 including the generator 210, conductor 211, contacts 274, conductor 224, switch 225, conductor 226, magnet 223 and conductor 219. Running conditions are thus established by the closing of the switch 243 so that the train can proceed, and said switch is then opened. Said switch 243 is either under lock and key or otherwise arranged so as to be operated only by an authorized person or under required conditions.

*Danger conditions.*—When a block of the track is under danger conditions, the relay magnet 260 at the entrance end of the block is deenergized, whereby the switches 257 and 258 are in normal position, with the track circuit open and deenergized, so that the conductor or vehicle circuit 244 does not receive current from the battery 259. The relay 247 thus remains in normal position while passing the control station in entering the danger block. Accordingly, when the choke coil 238 passes over the armature 242, the switches 212 and 220 drop open, thereby deenergizing the magnets 216 and 223, and the magnet 134 is also deenergized to establish danger conditions, inasmuch as the magnet 135 also remains deenergized. When the choke coil leaves the armature 242, so that the switches 212 and 220 are again closed, the switches 214, 222 and 225 remaining down will prevent the magnets 216, 134, 223 and 135 from being energized, so that danger conditions are in force, to require the stopping of the train or the slow travel thereof in order that a quick stop can be made if necessary to avoid a collision or accident. The lamp 232 is lighted to indicate danger conditions, the circuit including the generator 210, conductor 211, contacts 270, conductor 273, switch 220, conductor 221, switch 222, conductor 231 having the lamp 232 therein, and conductor 219.

If the switch 243 is closed by proper authority or under required conditions, the vehicle equipment is cleared, as hereinbefore described, so that the train can proceed without speed restriction.

*Clear conditions.*—When the track is clear ahead, the current flows through the relay magnet 260 in a direction to move the switches 257 and 258 against the respective contacts 255 and 254, so that current flows from the battery 259 through the conductor 251 and returns by way of the conductor 252. Then, when the choke coil 238 passes over the armature 242 at the control station at the entrance of the clear block, the conductor 244 of the vehicle or train and conductors 251 and 252 of the track complete a circuit with the ends of the conductor 244 connected almost directly with the opposite ends of the conductors 251 and 252, with only short portions of the rail R between said conductors, so that very little of the rail resistance is interposed in the circuit. Even though the resistance of the conductor 244 is greater than the resistance offered by the portions of the rail R and the locomotive and tender between the terminals of the conductor 244, a small portion of the current will flow through the conductor 244 from the battery 259, although the major part of the current will flow through the shunt or short circuit afforded by the rail and metal parts of the locomotive and tender. If the locomotive and tender are insulated from one another, this may help somewhat, although same is not necessary with proper adjustments of the relay 247, and the insulated joint 261 and resistance 262 will increase the flow of current through the conductor 244 under these conditions.

Now, with the choke coil 238 passing over the armature 242 and the switches 212 and 220 open, the relay 247 establishes alternate holding circuits for the magnets 216 and 223 to preserve or establish clear conditions. Thus, the conductor 244 having its terminals connected to the opposite terminals of the conductors 251 and 252 will complete a circuit including the battery 259, switch 258, contact 254, conductor 251, rail R, truck 246, conductor 244 and relay 247 therein, truck 245, rail R, conductor 252, contact 255 and switch 257. The flow of current being forwardly in the conductor 244 will energize the relay 247 to move the switch 248 against the contact 249, and although the switches 212 and 220 are open for a moment, the switch 248 keeps the magnets 216 and 223 energized. The circuit includes the generator 210, conductor 211, switch 248, contact 249, conductor 215, magnets 216 and 134 and lamp 218, and conductor 219. This prevents the magnets 216 and 134 from being deenergized, or if they are deenergized in passing the control station, said magnets will be energized to restore clear conditions. Although the switch 220 is open, the switch 225 remaining closed, will keep the magnet 223 energized, the circuit including the generator 210, conductor 211, contacts 274, conductor 224, switch 225, conductor 226, magnet 223 and conductor 219.

When the train leaves the control station, the switches 212 and 220 are reclosed to keep the magnets 216, 134 and 223 energized, and the conductor 244 being moved away from the partial track circuit, will result in the switch 248 moving back to normal or neutral position.

*Caution conditions.*—When the track conditions require caution after passing a control station or point of the track, the current flows through the magnet 260 at such control station in a direction opposite to the flow through the magnet for clear conditions, whereby the switches 257 and 258 are moved against the respective contacts 253 and 256, so that the current flows from the battery 259 through the conductor 252 and returns by way of the conductor 251.

When the choke coil 238 passes over the armature 242, the conductor 244 is connected in circuit with the conductors 251 and 252, the same as under clear conditions, and the flow of current through the conductor 244 will be rearwardly, so that the relay 247 is energized to move the switch 248 against the contact 250. Consequently, when the switches 212 and 220 drop open, the switch 248 remains against the contact 250 during such interval.

The switch 212 being opened will deenergize the magnets 216 and 134 and extinguish the lamp 218, so that the switches 214 and 225 drop down and remain down during caution conditions, and an alternative circuit for the magnet 223 is provided so that said magnet remains energized, such circuit including the generator 210, conductor 211, switch 248, contact 250, conductor 226, magnet 223 and conductor 219. By keeping the magnet 223 energized although the magnets 216 and 134 are deenergized, caution conditions are established.

When the choke coil leaves the armature, so that the switches 212 and 220 are again closed, the switches 214 and 225 remain down so that the magnets 216 and 134 remain deenergized, and the circuit of the magnet 223 includes the generator 210, conductor 211, contacts 270, conductor 273, switch 220, conductor 221, switch 222 which remains up, magnet 223 and conductor 219.

The switch 222 being up and the switch 225 down will result in the magnet 135 being energized, the circuit including the generator 210, conductor 211, contacts 270, conductor 273, conductor 221, switch 222, conductor 226, switch 225, conductor 228, magnet 135 and lamp 230, and conductor 219. Thus, with the magnet 134 deenergized and the magnet 135 energized caution conditions will prevail, the lamp 230 being lighted to indicate the fact. Should the choke coil 238 pass an armature 242 without the relay 247 being energized the switch 220 dropping open will break the circuits of the magnets 223 and 135, so that danger conditions are established.

*Speed control*

The electrical equipment as hereinbefore described is substantially the same as disclosed in my issued Patent No. 1,695,931, heretofore mentioned, but, as shown in Fig. 11, a speed control device is added which controls the circuits through the switches 212, 220 and 225 and through the magnet 109.

The governor 272 is operated at a speed proportional to the velocity of the train, by being connected to one of the wheels or in any well known manner, and the switch 271 is raised and lowered by the governor. Said switch has a bridging piece 275 between the contacts 270 which is removed from between said contacts when the speed of the train reaches a predetermined maximum, say for example seventy miles per hour. This will prevent the train from exceeding such maximum speed, inasmuch as the circuits through the switches 212 and 220 will be opened, thereby obtaining danger conditions, the magnets 216, 134 and 223 being deenergized. The bridging piece 275 is of such length as to keep the circuit between the contacts 270 closed until the maximum speed is reached.

The switch 271 also has a bridging piece 276 between the contacts 274 which is of such a length as to be removed from between the contacts 274 when the speed of the train exceeds a certain speed, say for example fifteen miles per hour. Consequently, when the speed of the train is above a predetermined minimum amount or fifteen miles per hour as given, the circuit through the conductor 224 and switch 225 is opened at the contacts 274, thereby preventing the clearing circuit through the switch 243 being closed. Consequently, the apparatus cannot be cleared when travelling above such minimum speed.

The switch 271 also has a bridging piece 277 between a pair of contacts 278, and the contacts 278, bridging piece 277, magnet 109 and switch 157 are connected in series between the conductors 211 and 237 (or 219). The switch 157, as hereinbefore described, is opened when the pneumatic equipment goes to danger position, so as to deenergize the magnet 109. Under caution conditions, with the switch 157 closed, the magnet 109 is controlled by the switch 271. The bridging piece 277 is of such a length as to keep the circuit of the magnet 109 closed as long as the train is travelling below a predetermined maximum caution speed, say for example thirty-five miles per hour. When such speed is exceeded, under caution conditions, the bridging piece 277 is raised from between the contacts 278, thereby deenergizing the magnet 109 and resulting in the application of the brakes, as hereinbefore explained, until the speed is reduced below such maximum caution speed, when the bridging piece 277 is again brought between the contacts 278 to reenergize the magnet 109.

The speed control switch 271 includes another bridging piece 280 between a pair of contacts 281 for the purpose of enabling the train to proceed at a slow speed, say below fifteen miles per hour, after danger conditions are established, in order that the train can proceed into a danger block at a very slow speed, to do shifting on an adjacent track or to move into a siding, or the like. Fig. 12 illustrates the modification to obtain such results. Thus, one contact 281 is connected to the conductor 211, and a conductor 282 connects the other contact 281 with one contact 283 of a pair, the conductor 231 being connected to the other contact 283. The switch 222, instead of engaging the conductor 231, carries an insulated switch 284 which bridges the contacts 283, when the switch 222 drops down. The clear electromagnet 134 has a separate coil or winding 285 between the conductors 231 and 219. A switch 286 is provided for the conductor 282, which may be under lock and key to prevent said switch being closed excepting under required conditions or by proper authority, and said switch may be such that it must be held closed by the engineer while proceeding under danger conditions, said switch opening when released, thereby requiring the engineer to be alert.

With this arrangement, when danger conditions are established, the switch 222 dropping down will cause the switch 284 to bridge the contacts 283, and when the switch 286 is closed, the train can proceed at a slow speed as long as the bridging piece 280 is between the contacts 281. The circuit includes the generator 210, conductor 211, contacts 281 and bridging piece 280, conductor 282, contacts 283 and switch 284, conductor 231, coil 285 and conductor 219. The valves of the magnet 134 are therefore raised to admit main reservoir air into the cylinder 110, so that the pneumatic equipment is restored to clear condition, permitting the train to proceed. However, the magnets 216 and 223 remain deenergized, inasmuch as the flow of current through the coil 285 is independent of the flow of current through the conductors 215 and 219.

Should the predetermined speed be exceeded, the bridging piece 280 being raised from between the contacts 281, will open the circuit of the coil 285, thereby letting the valves of the magnet 134 drop, to establish danger conditions at once. It is therefore necessary for the train to proceed slowly under danger condition, in order that a quick stop can be made if necessary.

When the apparatus is cleared, so that the magnets 134, 216 and 223 are reenergized, the switch 222 being raised will open the switch 284, thereby rendering the coil 285 ineffective.

Having thus described the invention, what is claimed as new is:—

1. In an automatic pneumatic brake apparatus, a brake pipe, a reservoir, a differential valve device subject to opposing pressures from said brake pipe and reservoir and operable to permit escape of the pressure fluid from the brake pipe when the brake pipe pressure is greater than the reservoir pressure, a plurality of expansion chambers, automatic means for connecting the reservoir and one expansion chamber, and automatic means controlled by the filling of said expansion chamber with fluid from said reservoir for connecting the reservoir with the other expansion chamber.

2. In an automatic pneumatic brake apparatus, a brake pipe, a reservoir, a differential valve device subject to opposing pressures from said brake pipe and reservoir and operable to permit escape of fluid from the brake pipe when the brake pipe pressure is greater than the reservoir pressure, a plurality of expansion chambers, automatic means for connecting the reservoir to one expansion chamber, and automatic means controlled by the filling of said expansion chamber by fluid from the reservoir for connecting the reservoir with the other expansion chamber, said first-named automatic means, when restored, connecting the brake pipe and reservoir and opening said chambers into the atmosphere.

3. In an automatic pneumatic brake apparatus, a brake pipe, a reservoir, an expansion chamber, automatic valve means normally connecting said brake pipe and reservoir and operable for disconnecting them and for connecting the reservoir and chamber, a differential valve device subject to opposing pressures from said brake pipe and reservoir and operable to permit escape of pressure fluid from the brake pipe when the brake pipe pressure is greater than the reservoir pressure, and automatic valve means controlled by the filling of said chamber from the reservoir and operable for permitting further flow of fluid from the reservoir.

4. In an automatic pneumatic brake apparatus, a brake pipe, a reservoir, a differential valve device subject to opposing pressures from said brake pipe and reservoir and operable to permit escape of pressure fluid from the brake pipe when the brake pipe pressure is greater than the reservoir pressure, two expansion chambers, an automatic valve means normally connecting the brake pipe and reservoir and normally connecting one expansion chamber with the atmosphere, and operable for disconnecting said reservoir and brake pipe, closing said chamber from the atmosphere and connecting said reservoir and chamber, valve means normally connecting the other chamber with the atmosphere and operable for connecting the reservoir and last named chamber, and means controlled by the filling of the first-named chamber by fluid from the reservoir for operating the last named valve means after an interval.

5. In an automatic pneumatic brake apparatus, a brake pipe, a reservoir, a differential valve device subject to opposing pressures from said brake pipe and reservoir and operable to permit escape of pressure fluid from the brake pipe when the brake pipe pressure is greater than the reservoir pressure, an expansion chamber, valve means normally connecting said reservoir and brake pipe and operable to disconnect them and connect the reservoir and chamber, a pressure fluid operated valve operable to permit further flow of pressure fluid from the reservoir, and a valve controlling the flow of pressure fluid to said valve and operated by pressure fluid in said chamber to establish the flow to said pressure fluid operated valve.

6. In an automatic pneumatic brake apparatus, a brake pipe, a reservoir, a differential valve device subject to opposing pressures from said brake pipe and reservoir and operable to permit escape of pressure fluid from the brake pipe when the brake pipe pressure is greater than the reservoir pressure, two expansion chambers, automatic valve means normally connecting the reservoir and brake pipe and operable for disconnecting them and connecting the reservoir and one expansion chamber, a pressure fluid operated valve for connecting the reservoir and the other expansion chamber, a valve operated by pressure fluid in the first-named chamber for establishing the flow of pressure fluid to said pressure fluid operated valve, and means for restricting the flow of pressure fluid to said pressure fluid operated valve and permitting free reverse flow when the last-named valve is restored, said valves normally connecting the second named chamber with the atmosphere and permitting reverse flow of pressure fluid from the last-named valve.

7. In an automatic pneumatic brake apparatus, a valve device movable to normal and two other positions, automatic means for positioning said device, a brake pipe, a speed controlled valve movable to operative position below a predetermined vehicle speed, means operable in cooperation with said valve device and valve for the limited escape of pressure fluid from the brake pipe when the valve device is in one of said two other positions and said valve is in operative position, and means for the unrestricted flow of pressure fluid from the brake pipe when said valve device is in the other of said two other positions.

8. In an automatic pneumatic brake apparatus, a valve device movable to normal and two other positions, automatic means for positioning said device, a brake pipe, a main reservoir pipe, a brake valve connected to the main reservoir pipe, a speed controlled valve movable to operative position below a predetermined vehicle speed, means operable in cooperation with said valve device and speed controlled valve for the limited escape of pressure fluid from the brake pipe when the valve device is in one of said two other positions and said speed controlled valve is in operative position, means for the unrestricted flow of pressure fluid from the brake pipe when said valve device is in the other of said two other positions, and means for stopping the flow of pressure fluid from the main reservoir pipe to the brake valve when said valve device and speed controlled valve are in either position for the escape of pressure fluid from the brake pipe.

9. In an automatic pneumatic brake apparatus, a valve device movable to clear, caution and danger positions, automatic means for positioning said device, a brake pipe, a speed controlled valve movable from normal to operative position below a predetermined vehicle speed, means operable in cooperation with said valve device and valve for the limited escape of pressure fluid from the brake pipe when said valve device is in caution position and said valve is in operative position, and means for the unrestricted escape of pressure fluid from the brake pipe when said valve device is in danger position.

10. In an automatic pneumatic brake apparatus, a valve device movable to clear, caution and danger positions, automatic means for positioning said device, a brake pipe, a main reservoir pipe, a brake valve connected to the main reservoir pipe, a speed controlled valve movable from normal to operative position below a predetermined vehicle speed, means operable in cooperation with said valve device and speed controlled valve for the limited escape of pressure fluid from the brake pipe when the valve device is in caution position and the speed controlled valve is in operative position, means for the unrestricted escape of pressure fluid from the brake pipe when said valve device is in danger position, and means for shutting off the flow of pressure fluid from the main reservoir pipe to the brake valve when said valve device is in danger position or when said valve device is in caution position with the speed control valve in operative position.

11. In an automatic pneumatic brake apparatus, a valve device movable to clear, caution and danger positions, automatic means for positioning said device, a brake pipe, a speed controlled valve movable from normal to operative position below a predetermined vehicle speed, means operable in cooperation with said valve device and valve for the limited escape of pressure fluid from the brake pipe when said valve device is in danger position or when said valve device is in caution position with the speed controlled valve in operative position, means for the unrestricted flow of pressure fluid from the brake pipe when the valve device is in danger position, and means for rendering the last-named means inoperative to prevent the escape of pressure fluid therethrough.

12. In an automatic pneumatic brake apparatus, a valve device movable to clear, caution and danger positions, automatic means for positioning said device, a brake pipe, a reservoir, a differential valve device subject to opposing pressures from said brake pipe and reservoir and operable to permit escape of pressure fluid from the brake pipe when the brake pipe pressure is greater than the reservoir pressure, an expansion chamber, a speed controlled valve movable from normal to operative position below a predetermined vehicle speed, said first-named valve device, when in clear position, connecting the reservoir and brake pipe, said first-named valve device, when in caution or danger position, and said speed controlled valve when in operative position, connecting said reservoir and chamber.

13. In an automatic pneumatic brake apparatus, a valve device movable to clear, caution and danger positions, automatic means for positioning said device, a brake pipe, a reservoir, a differential valve device subject to opposing pressures from said brake pipe and reservoir and operable to permit escape of pressure fluid from the brake pipe when the brake pipe pressure is greater than the reservoir pressure, an expansion chamber, a speed controlled valve movable from normal to operative position below a predetermined vehicle speed, said first-named valve device, when in clear position, connecting the reservoir and brake pipe, said first-named valve device, when in caution or danger position, and said speed controlled valve, when in operative position, connecting said reservoir and chamber, and optional means for the unrestricted flow of pressure fluid from the brake pipe when said first-named valve device is in danger position.

14. In an automatic pneumatic brake apparatus, a valve device movable to clear, caution and danger positions, automatic means for positioning said device, a speed controlled valve movable from normal to operative position below a predetermined vehicle speed, and pneumatic brake applying means controlled by said valve device and valve and operable for obtaining a service application of the brakes when said valve device is in caution position with the speed controlled valve in operative position, and for obtaining an emergency application of the brakes when said valve device is in danger position.

15. In an automatic pneumatic brake apparatus, a valve device movable to clear, caution and danger positions, automatic means for positioning said device, a speed controlled valve movable from normal to operative position below a predetermined vehicle speed, a pneumatic brake applying means controlled by said valve device and valve and operable for obtaining a service application of the brakes when said valve device is in either caution or danger position with the speed controlled valve in operative position, and optional means for obtaining an emergency application of the brakes when said valve device is in danger position.

16. In an automatic pneumatic brake apparatus, a brake pipe, a main reservoir pipe, a valve device movable from clear to caution and danger positions in succession by pressure from the main reservoir pipe, automatic means for moving said valve device against main reservoir pressure to caution and clear positions, a second valve device movable by pressure from the brake pipe from normal to operative position, speed controlled means for moving the second valve device to normal position against brake pipe pressure below a predetermined vehicle speed, and means controlled by said valve devices for the discharge of air from the brake pipe when said valve devices are moved by main reservoir and brake pipe pressures, respectively.

17. In an automatic pneumatic brake apparatus, a brake pipe, a main reservoir pipe, a valve device movable by pressure from the main reservoir pipe from clear to caution and danger positions in succession, a second valve device movable by pressure from the brake pipe from normal to operative position, speed controlled means for admitting pressure from the main reservoir pipe to the second valve device, said second valve device being movable under main reservoir pressure from operative to normal position in opposition to brake pipe pressure, two pneumatically operable means controlling the first-named valve device, selectively controlled means for admitting pressure from the main reservoir pipe to said pneumatically operable means, one of said pneumatically operable means being operable under main reservoir pressure to move the first-named valve device to clear position and the other pneumatically operable means being operable to move the first-named valve device to caution position, and means for the discharge of pressure fluid from the brake pipe when the first-named valve device is in danger position or when said first-named valve device is in caution position with the second valve device in operative position.

18. In an automatic pneumatic brake apparatus, three alining cylinders, a piston in each cylinder, a valve connected to the piston of one cylinder to move with said piston, said piston being subject to fluid pressure continually tending to move the valve from one position to two other positions in succession, selectively controlled means for admitting pressure fluid to the two other cylinders to move the pistons thereof in opposition to the aforesaid piston, and members carried by the pistons to contact with one another for moving the first-named piston and valve reversely to different positions when the pistons in said other two cylinders are moved by pressure fluid, and brake applying means controlled by said valve in its different positions.

19. In an automatic pneumatic brake apparatus, a valve device movable to clear, caution and danger positions, automatic means for positioning said device, a brake pipe, a main reservoir pipe, a second valve device moved by pressure from the brake pipe from normal to operative position, brake applying means operable in cooperation with said valve device for the escape of air from the brake pipe when the first-named valve device is in danger position or when the first-named valve device is in caution position with the second valve device in operative position, a valve for admitting pressure fluid from the main reservoir pipe to the second valve device, said second valve device being movable by main reservoir pressure from operative to normal position in opposition to brake pipe pressure, an electromagnet controlling said valve for the flow of main reservoir pressure to the second valve device when the magnet is energized, speed controlled means for opening the circuit of said magnet below a predetermined vehicle speed, and means for opening the circuit of said magnet when the first-named valve device is in danger position.

20. In an automatic train control apparatus, the combination with a brake application valve device, of a pilot valve device for controlling the operation of said application valve device and means operative in accordance with the traffic conditions for controlling the operation of said pilot valve device.

21. In an automatic train control apparatus, the combination with a brake pipe, of means operative upon a change in the signal indication for at one time effecting a reduction in brake pipe pressure in a single stage and at another time in two stages.

22. In an automatic train control apparatus, the combination with a brake pipe, of means operating in accordance with the character of the change in the signal indication for either effecting a reduction in brake pipe pressure in one stage or in two stages.

23. In an automatic train control apparatus, the combination with a brake pipe, of signal controlled means for effecting selectively a reduction in brake pipe pressure either in a single stage or in two stages.

24. In an automatic train control apparatus, the combination with a brake pipe, of means for effecting a reduction in brake pipe pressure in a single stage, means for effecting a reduction in brake pipe pressure in two stages, and signal controlled means selectively controlling the first and second-named means.

25. In an automatic train control apparatus, the combination with a brake pipe, of means responsive to one signal indication for effecting a reduction in brake pipe pressure in two stages, and means responsive to another signal indication for effecting a reduction in brake pipe pressure in a single stage.

26. Train control apparatus comprising a brake pipe, a signal controlled valve device having a normal and two signal controlled brake applying positions, and a speed controlled pressure operated valve means movable, by reduction in fluid pressure, to brake applying position, said valve device and means controlling the brake pipe to obtain one kind of a reduction in brake pipe pressure with said valve device in one brake applying position and said valve means in brake applying position, and to obtain another kind of a reduction in brake pipe pressure with said valve device in the other brake applying position.

27. In an automatic train control apparatus, the combination with a brake pipe, of means for automatically effecting a reduction in brake pipe pressure in two stages, an electrically controlled valve having a position for rendering said means ineffective and movable upon a change in the speed of the train to a position for rendering said means effective.

28. In a fluid pressure brake, the combination of a brake pipe, a valve device effective, in one position, to permit a plural-stage reduction in brake pipe pressure and, in another position, a single-stage reduction, and speed-controlled means governing the movement of the valve device to single-stage position.

29. In a fluid pressure brake, the combination of a brake pipe, an equalizing reservoir, a valve mechanism subject to the opposing pressures of the brake pipe and the equalizing reservoir for controlling the venting of fluid from the brake pipe, a reduction reservoir, an application device operative to connect said reduction reservoir with the equalizing reservoir, a second reduction reservoir, valve means operative to connect said second reduction reservoir with the equalizing reservoir, means for delaying the operation of said valve means, and means jointly controlled by train speed and traffic conditions for actuating said application valve device.

30. Brake-applying mechanism for automatic train control systems, comprising the combination of automatic means associated with the usual air brake system for effecting a two-stage brake application which if initiated first reduces the brake pipe pressure to a predetermined extent sufficient to bunch the slack between successive cars of a train and then a predetermined time thereafter sufficient to allow such bunching of cars, causes a further and predetermined reduction in the brake pipe pressure, and means jointly controlled by train speed and traffic conditions for setting said automatic means in operation.

31. Brake-applying mechanism for automatic train control systems, comprising the combination of valve means normally permitting the flow of main reservoir pressure to the usual engineer's valve and also charging a suitable chamber to existing brake pipe pressure, said valve means when moved to application position acting to cut off main reservoir pressure from the engineer's valve and to reduce the pressure in said chamber to a predetermined extent, automatic means for causing a further predetermined reduction in pressure of said chamber after a predetermined lapse of time following the operation of the valve, automatic means venting the brake pipe to a pressure corresponding to that in said chamber, and means for automatically controlling said valve means in response to train speed and traffic conditions.

32. In an automatic train control system, the combination with the usual air brake system, of a pressure reservoir and a reduction reservoir, valve means for normally connecting said pressure reservoir to the brake pipe and said reduction reservoir to atmosphere, said valve means being operable to connect said reservoirs to each other to cause a pressure reduction in said pressure reservoir, means for venting the brake pipe when the pressure therein exceeds that of the pressure reservoir, means for causing a further predetermined pressure reduction in said pressure reservoir after a predetermined lapse of time following the operation of said application valve, and means for automatically controlling said valve means in response to train speed and traffic conditions.

33. Mechanism for automatically applying the brakes for train control purposes on vehicles equipped with the usual air brake systems, comprising in combination with the usual brake pipe of a pressure reservoir, a reduction reservoir, valve means normally connecting the reduction reservoir to atmosphere and the pressure reservoir to the brake pipe, said valve means being operable to disconnect said normal connections and connect said reservoirs together, means for automatically causing a reduction in brake pipe pressure to accord with that in the pressure reservoir after the valve means has operated, a second reduction reservoir normally at atmospheric pressure, a secondary valve for further reducing pressure in the pressure reservoir by connecting it to the second reduction reservoir, means for automatically operating said secondary valve after the lapse of a predetermined time interval following the operation of the first-mentioned valve means, and automatic means for jointly controlling said valve means in response to train speed and traffic conditions.

34. Mechanism for automatically applying the brakes for train control purposes on railway vehicles equipped with the usual automatic air brake system, comprising the combination of automatic means operable to vent the brake pipe pressure to a predetermined extent in successive stages, means having its operation dependent upon the lapse of time and automatically controlled simultaneously with said automatic means for determining the time interval between said successive stages of reduction, and means jointly controlling said automatic means in response to train speed and traffic conditions.

35. Mechanism for automatically applying the brakes of railway vehicles equipped with the usual automatic air brake system, comprising the combination of pressure-responsive means for venting the brake pipe of the air brake system down to a predetermined pressure corresponding to that governing said means, automatic means for varying the controlling pressure for said means in two successive stages with an intervening time interval, and means automatically actuated under the joint control of train speed and traffic conditions for setting said automatic means in operation.

36. Mechanism for automatically applying the brakes of railway vehicles equipped with the usual automatic air brake system, comprising the combination of a pressure reservoir, a pressure operated valve for venting the brake pipe of the air brake system down to a pressure equal to that then existing in said pressure reservoir, automatic means operable to reduce the pressure in said pressure reservoir to a predetermined value in two successive stages with an intervening time interval, and means automatically actuated under the joint control of train speed and traffic conditions for setting said automatic means in operation.

37. In a system of automatic control for the air brakes of vehicles for train control purposes, the combination of the usual brake pipe, a pressure operated valve for venting the brake pipe, a reservoir supplying pressure to said valve, control means operable to reduce pressure in said reservoir in two successive stages, timing means set into operation concurrently with the initiation of the operation of said control means for determining the interval of time between said stages, and means automatically actuated under the joint control of train speed and traffic conditions for initiating the operation of said control means.

38. In a system of automatic control for the air brakes of vehicles for train control purposes, the combination of the usual brake pipe, a pressure reservoir, a valve venting the brake pipe to atmosphere until its pressure corresponds with that then existing in said reservoir, a reduction reservoir normally at atmospheric pressure, means operable to connect the pressure reservoir to the reduction reservoir and thereby make a predetermined reduction in pressure in the pressure reservoir, depending upon the relative volumes of said reservoirs, a second reduction reservoir, timing means automatically set into operation by increase of pressure in the first reduction reservoir for connecting the pressure reservoir to the second reduction reservoir after the lapse of a time interval, and automatic means under the joint control of train speed and traffic conditions operative to initiate the operation of said first-named means.

39. Brake-applying mechanism for automatic train control systems, comprising the combination of means operable to reduce the brake pipe pressure in the usual air brake system to a predetermined fractional part of its original value when operated, other automatic means for further reducing the brake pipe pressure to a predetermined fractional part of the then existing pressure, said last-mentioned means being operated a predetermined time after said first-mentioned means has been operated, and means automatically actuated under the joint control of train speed and traffic conditions for initiating the operation of said first-mentioned means.

40. In air brake controlling apparatus of the character described, the combination with a brake pipe, of automatic means venting the brake pipe to varying extents in succession with an intervening time interval sufficient to allow the slack between the cars of the train to be taken up, and means under the joint control of train speed and traffic conditions for initiating the operation of said automatic means.

41. In an air brake controlling apparatus of the character described, the combination with a brake pipe, of automatic means producing two successive reductions in brake pipe pressure of different values and spaced apart a period of time sufficient to allow the slack between the cars of the train to be taken up, and means under the joint control of train speed and traffic conditions for initiating the operation of said automatic means.

42. In an automatic train control apparatus, the combination with a brake pipe, of means for automatically effecting a reduction in brake pipe pressure in two stages, and mechanism jointly controlled in accordance with the speed of the train and traffic conditions for rendering said means effective or ineffective.

43. In an automatic train control apparatus, the combination with a brake pipe, of means for automatically effecting a reduction in brake pipe pressure in two stages, and mechanism having a position for rendering said means ineffective and movable upon a change in the speed of the train and traffic conditions to a position for rendering said means effective.

44. In an automatic train control apparatus, the combination with a brake pipe, of means for automatically effecting a reduction in brake pipe pressure in two stages, mechanism for cutting said means into and out of operation, a speed governor operated according to the speed of the train, and means controlled by said speed governor and traffic conditions for controlling the operation of said mechanism.

45. In a fluid pressure brake, the combination with a brake pipe, of automatic means for effecting a predetermined reduction in brake pipe pressure, means operated automatically upon completion of said predetermined reduction in brake pipe pressure for effecting a second reduction in brake pipe pressure, and means automatically controlled in response to train speed and traffic conditions for actuating said automatic means.

46. In a fluid pressure brake, the combination with a brake pipe, of automatic means for effecting a predetermined reduction in brake pipe pressure, means automatically operated upon completion of said predetermined reduction in brake pipe pressure for effecting a second reduction in brake pipe pressure, and means for actuating said automatic means including a pair of electro-pneumatic valves electrically controlled from the trackway in response to traffic conditions.

DANIEL HERBERT SCHWEYER.